United States Patent
Miyachi

(10) Patent No.: US 11,314,079 B2
(45) Date of Patent: Apr. 26, 2022

(54) OPTICAL DEFLECTOR INCLUDING ROTATABLE MIRROR PART HAVING FLAT AND GROOVED REFLECTION SURFACES, AND OPTICAL SCANNING APPARATUS

(71) Applicant: STANLEY ELECTRIC CO., LTD., Tokyo (JP)

(72) Inventor: Mamoru Miyachi, Tokyo (JP)

(73) Assignee: STANLEY ELECTRIC CO., LTD., Tokyo (JP)

(*) Notice: Subject to any disclaimer, the term of this patent is extended or adjusted under 35 U.S.C. 154(b) by 57 days.

(21) Appl. No.: 16/890,351

(22) Filed: Jun. 2, 2020

(65) Prior Publication Data
US 2020/0386987 A1 Dec. 10, 2020

(30) Foreign Application Priority Data

Jun. 4, 2019 (JP) .............................. JP2019-104370

(51) Int. Cl.
*G02B 26/12* (2006.01)
*G02B 26/08* (2006.01)

(52) U.S. Cl.
CPC ......... *G02B 26/125* (2013.01); *G02B 26/085* (2013.01); *G02B 26/0841* (2013.01); *G02B 26/0858* (2013.01)

(58) Field of Classification Search
None
See application file for complete search history.

(56) References Cited

U.S. PATENT DOCUMENTS

| 8,035,813 B2 | 10/2011 | Galle |
| 9,323,070 B2 | 4/2016 | Vink et al. |
| 2003/0043373 A1* | 3/2003 | Russell .............. G01J 3/06 356/328 |
| 2015/0034591 A1* | 2/2015 | Vink ..................... G02B 5/1852 216/24 |
| 2018/0172994 A1* | 6/2018 | Robbins ............ G02B 26/0833 |

FOREIGN PATENT DOCUMENTS

| EP | 2533077 A1 | 12/2012 |
| JP | 2006243225 A | 9/2006 |
| JP | 2011118178 A | 6/2011 |
| WO | 2007145554 A1 | 12/2007 |

OTHER PUBLICATIONS

Partial European Search Report dated Nov. 17, 2020 issued in European Application No. 20176867.8.

* cited by examiner

*Primary Examiner* — Jennifer D. Carruth
(74) *Attorney, Agent, or Firm* — Holtz, Holtz & Volek PC

(57) ABSTRACT

Provided is an optical deflector that detects an arbitrary deflection angle of a mirror part while avoiding the increase in the length of an optical sensor for detection of the deflection angle. An optical deflector 3 comprises: a mirror part 30 that has a flat reflection surface 38 and a grooved reflection surface 39, each of the flat reflection surface 38 and the grooved reflection surface 39 reflecting an incident light; and an actuator 32a to 32d that reciprocally turns the mirror part 30 about a rotation axis 36. The grooved reflection surface 39 has a plurality of longitudinal grooves 41 that extends parallel to the rotation axis 36. Each longitudinal groove 41 has a facing inclination surface 42a, 42b that is parallel to the rotation axis 36 and that has at least an opening-side portion of a facing inclination surface of a V-groove.

19 Claims, 19 Drawing Sheets

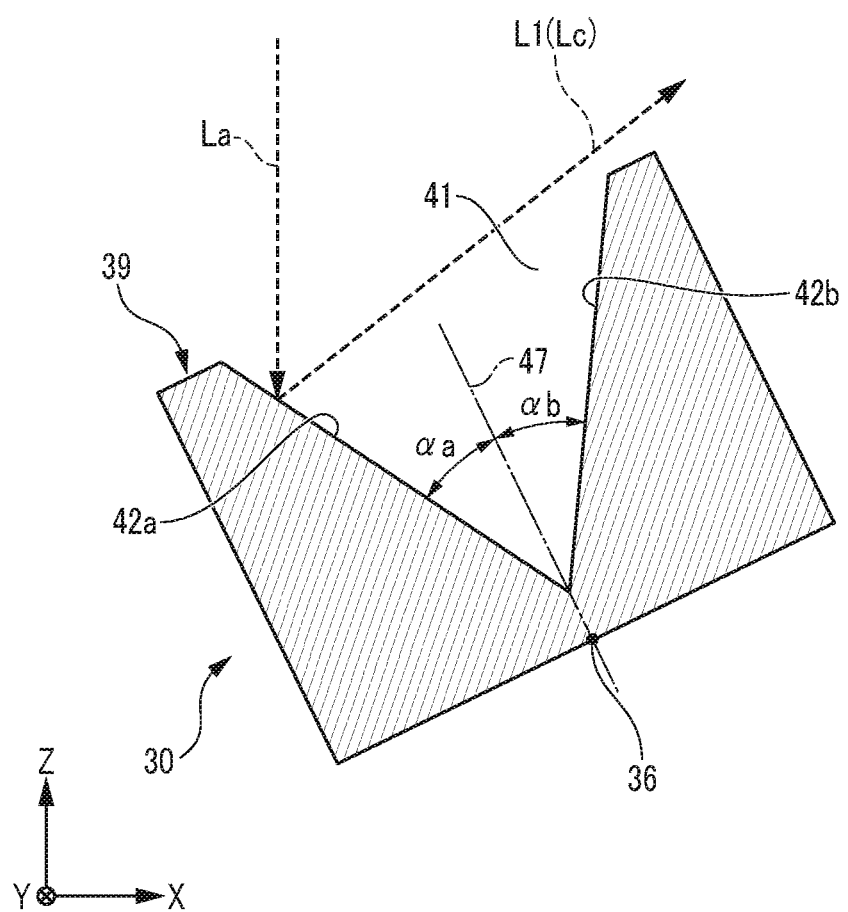

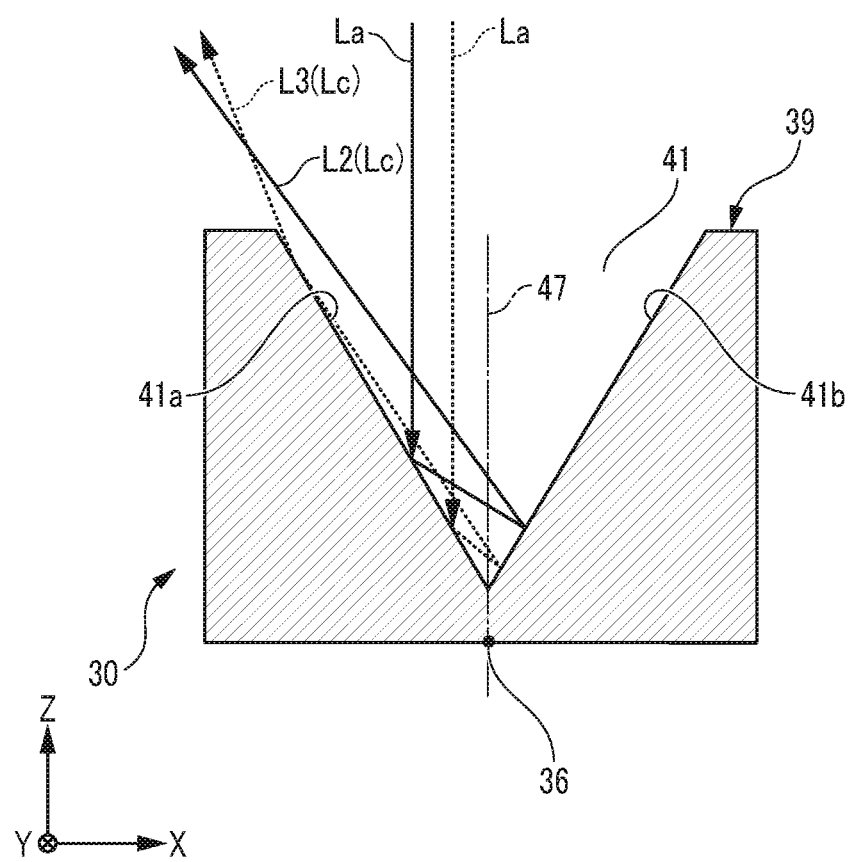

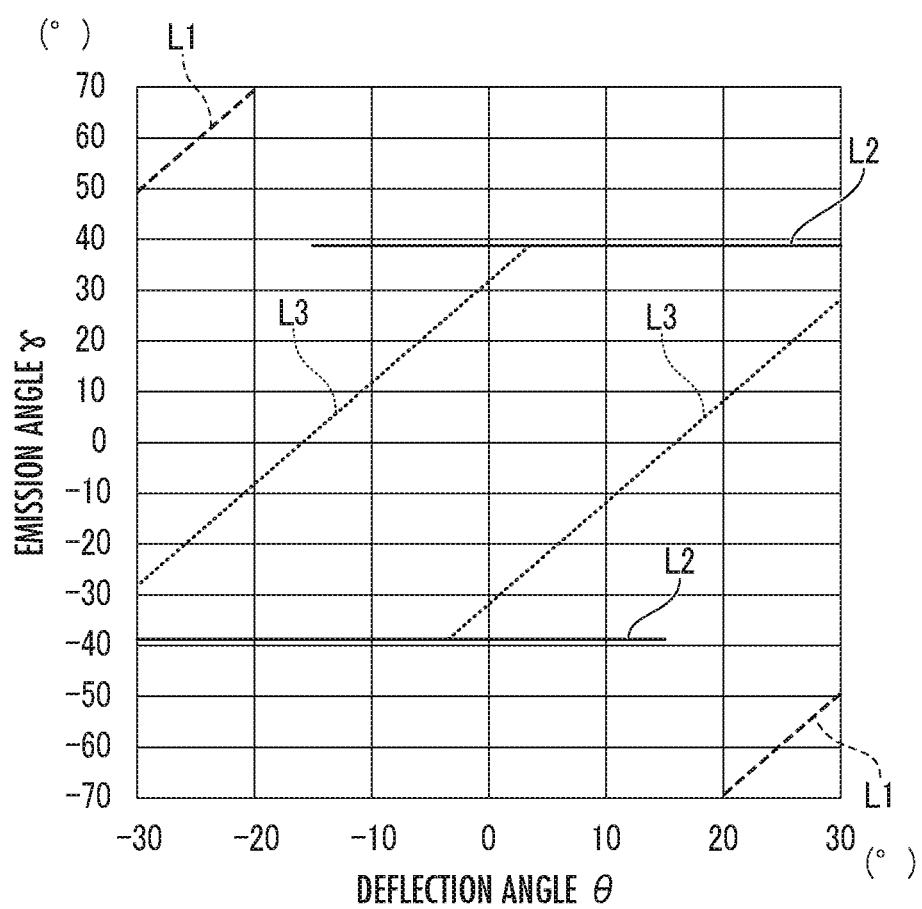

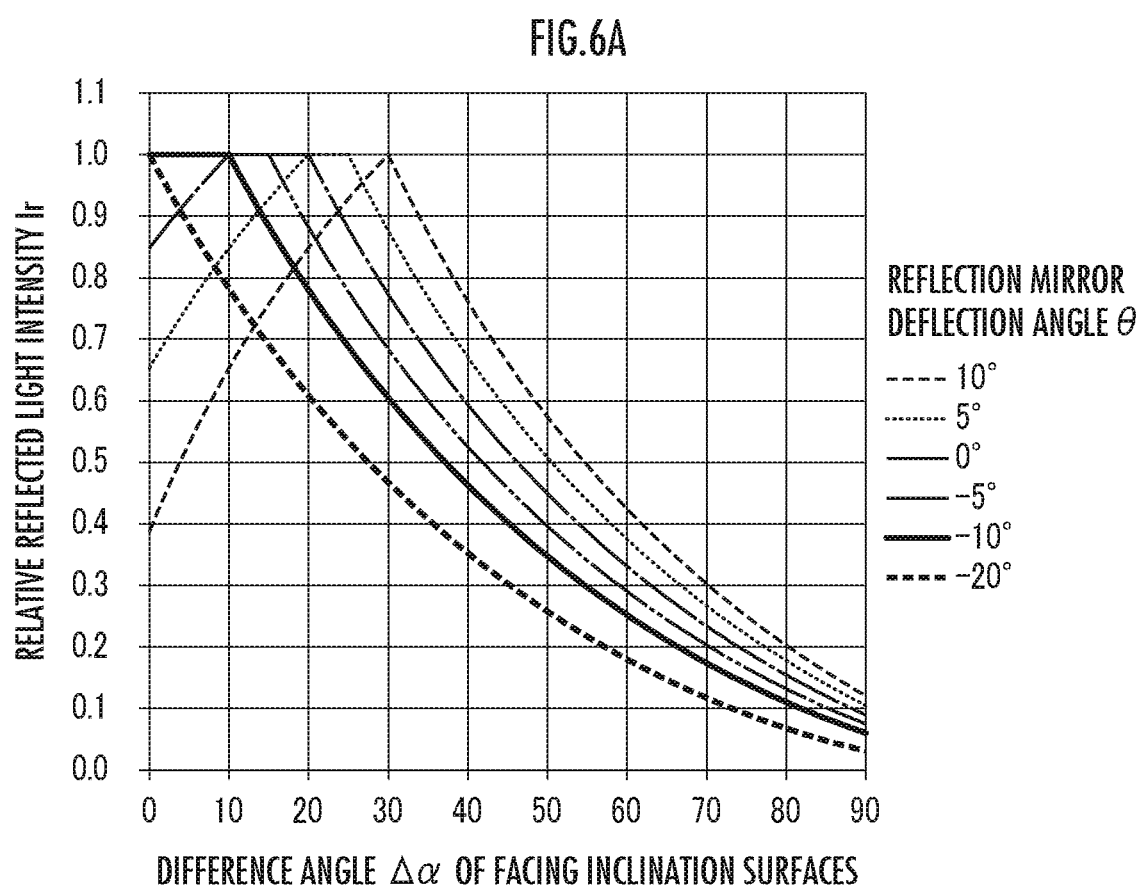

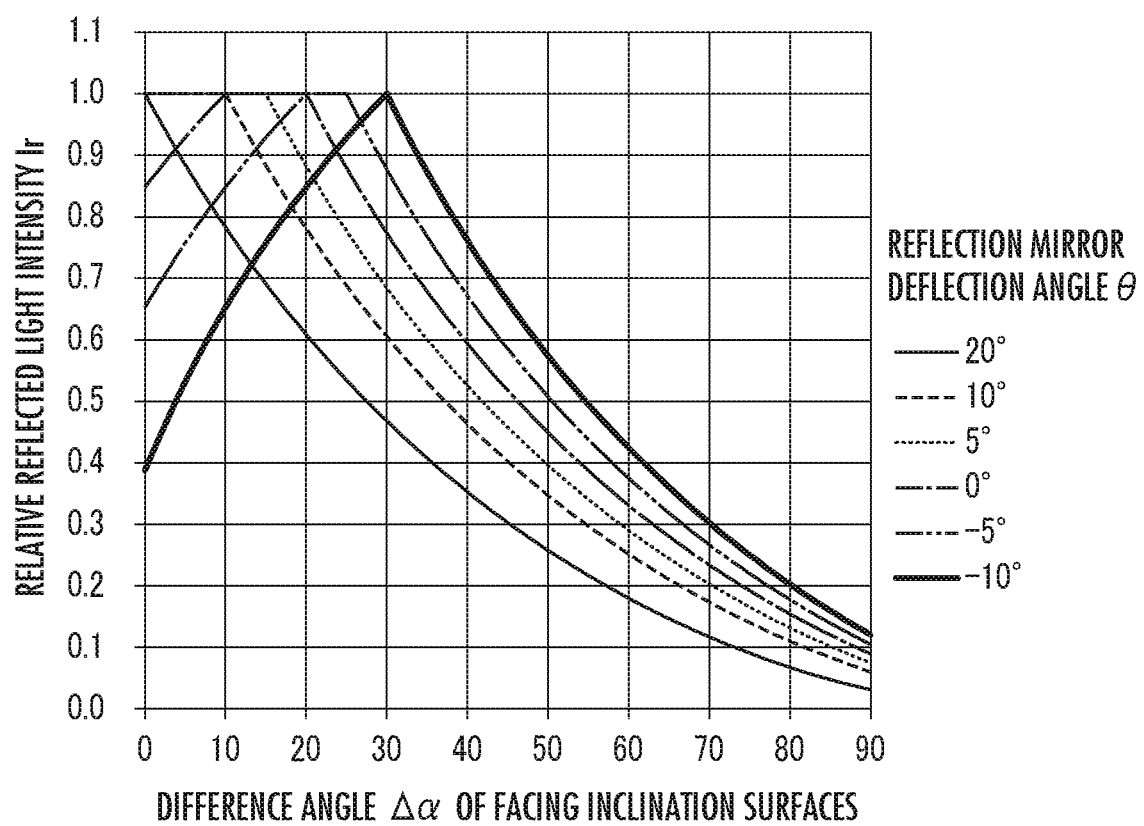

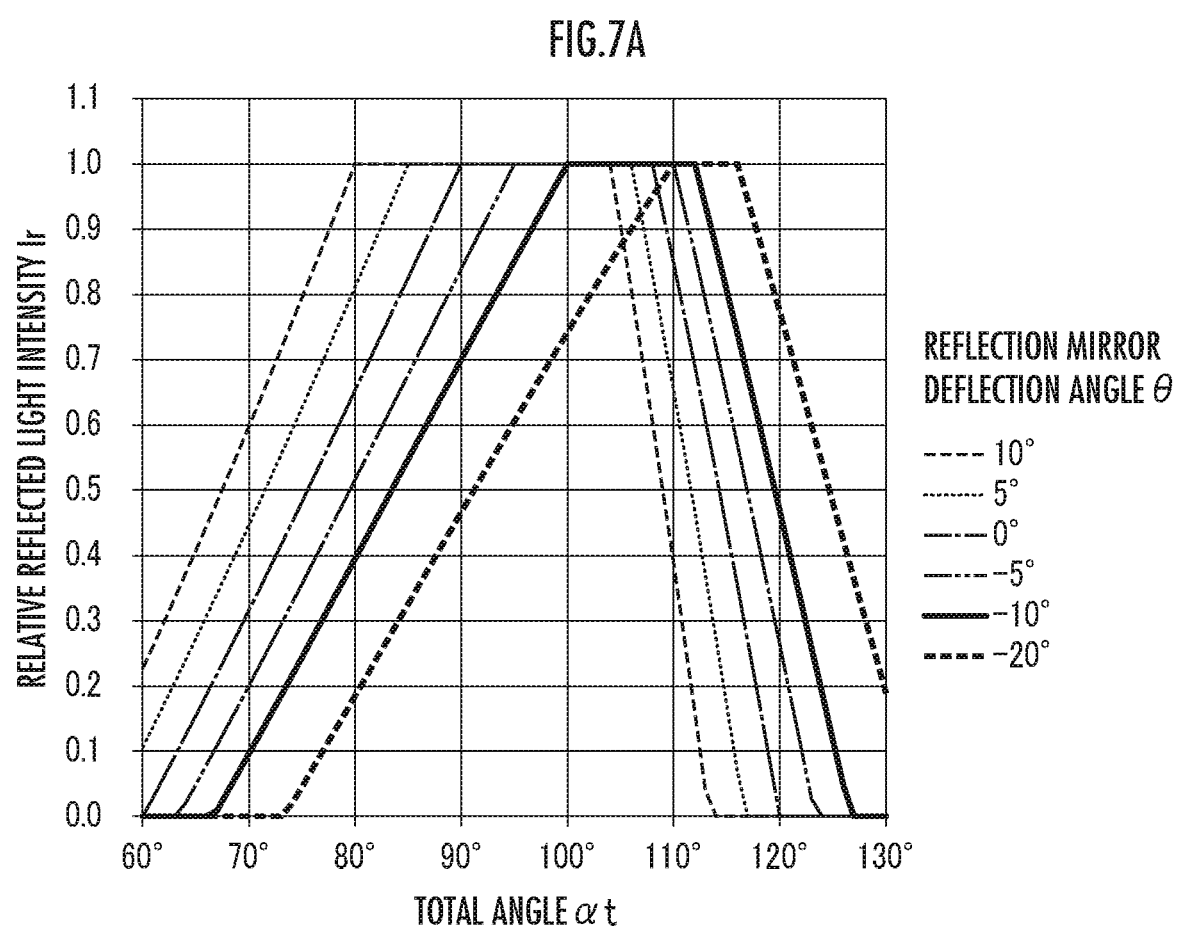

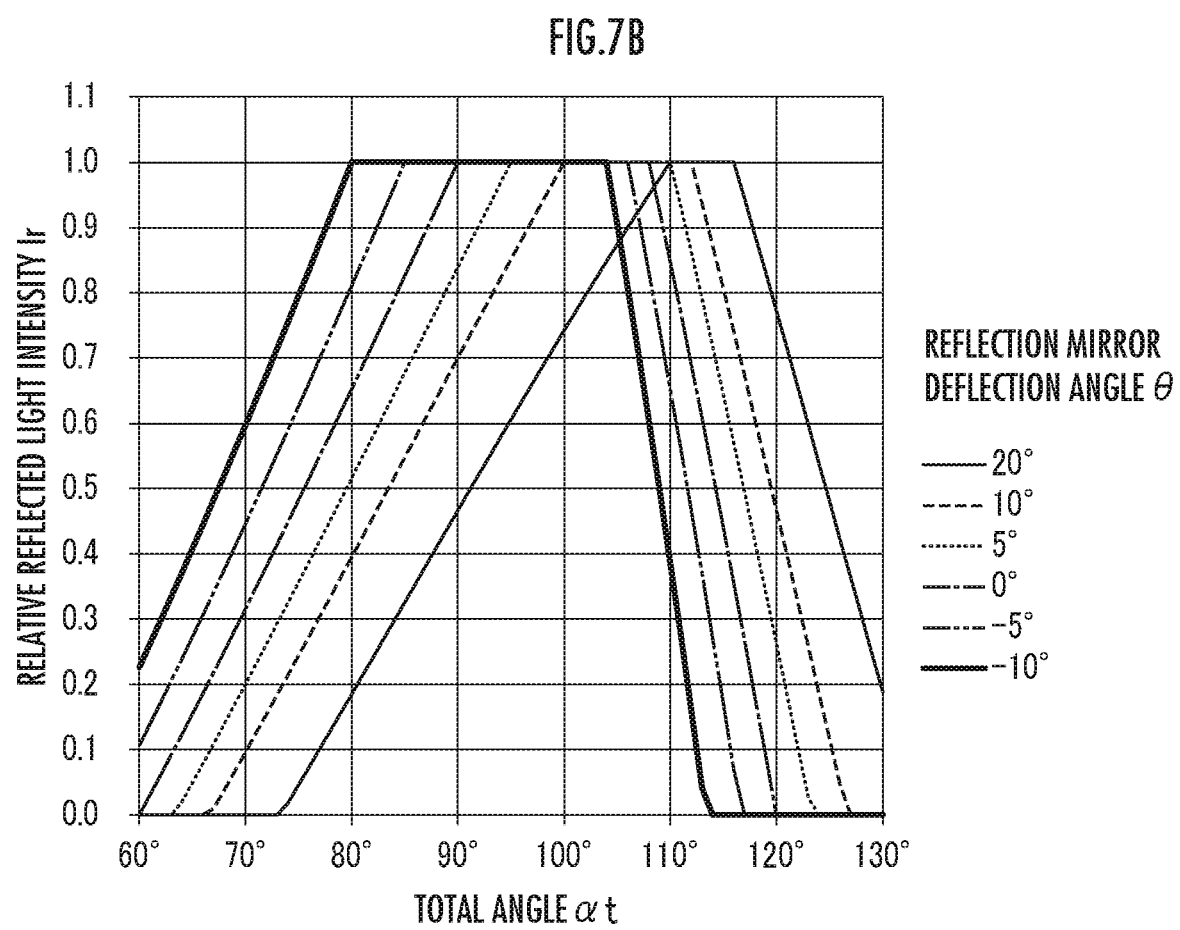

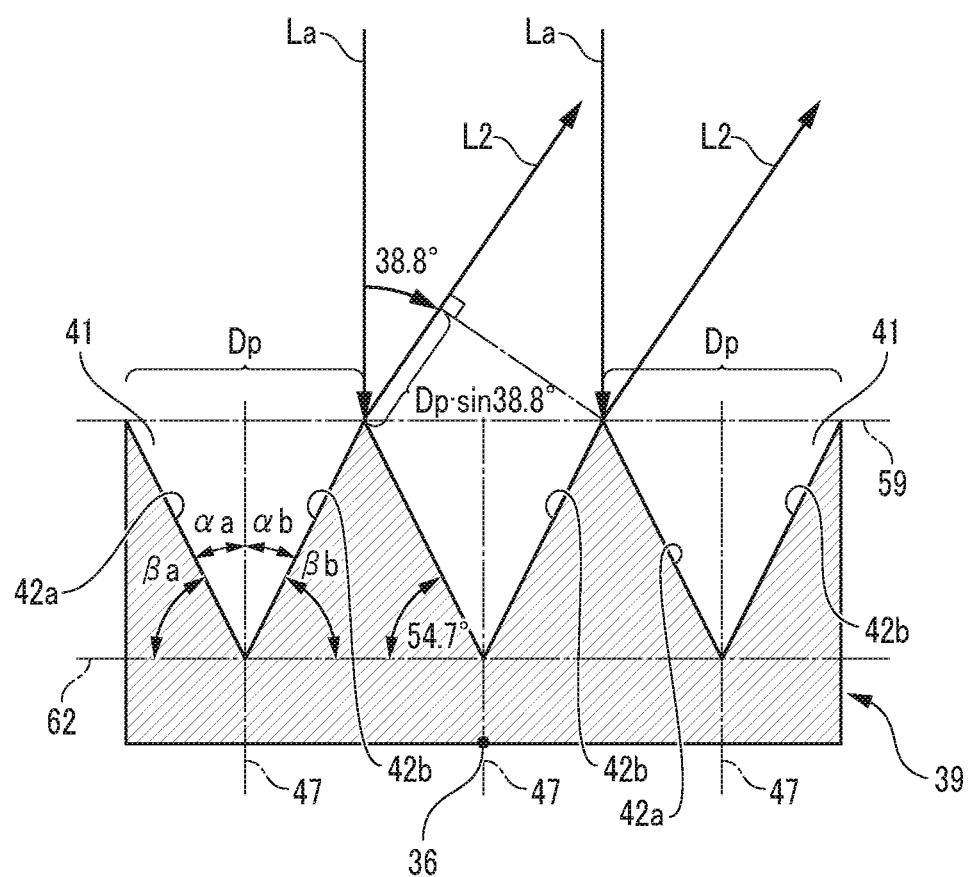

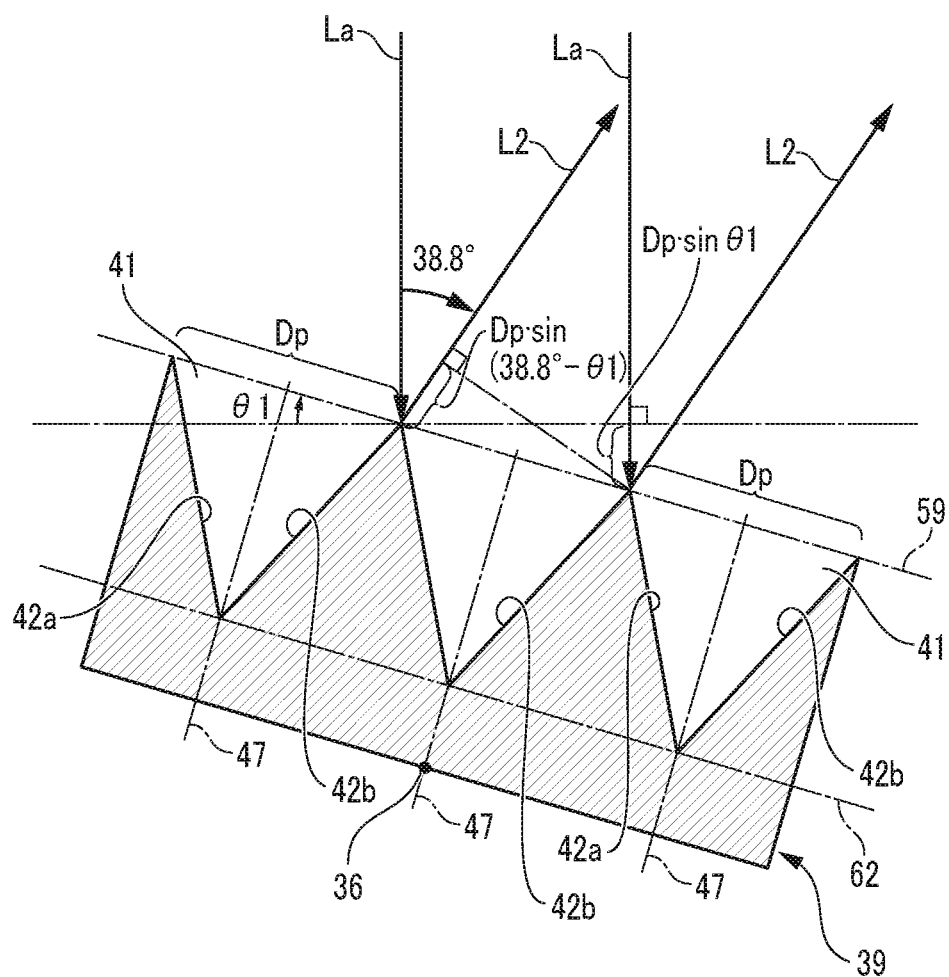

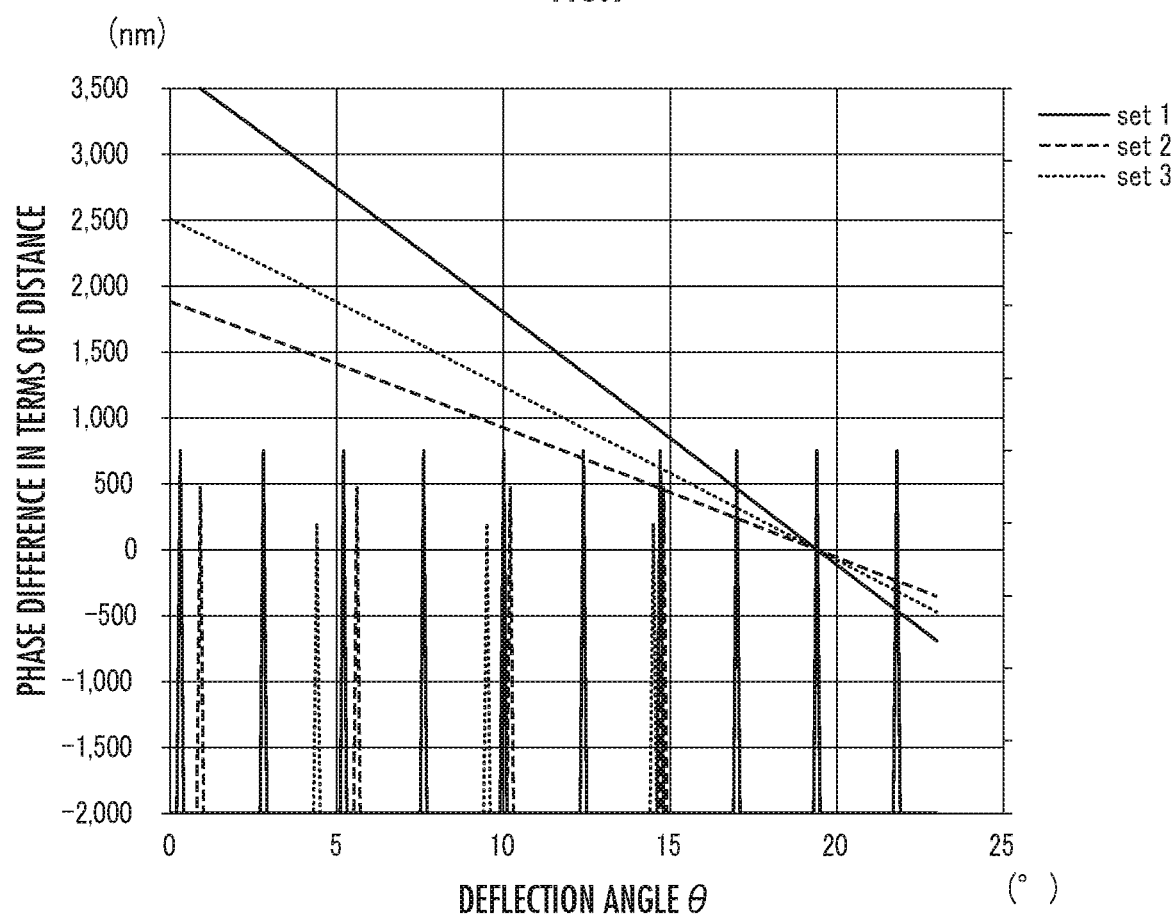

OPTICAL DEFLECTOR INCLUDING ROTATABLE MIRROR PART HAVING FLAT AND GROOVED REFLECTION SURFACES, AND OPTICAL SCANNING APPARATUS

BACKGROUND OF THE INVENTION

1. Field of the Invention

The present invention relates to an optical deflector and an optical scanning apparatus.

2. Description of the Related Art

There are known an optical deflector for MEMS (Micro Electro Mechanical Systems) and an optical scanning apparatus comprising the optical deflector (e.g. JP P2006-243225A and JP P2011-118178A). The optical deflector for MEMS comprises a mirror part that is reciprocally turned about a rotation axis, and reflects a light from an optical source in a direction depending on the deflection angle of the mirror pa, to emit the reflected light as a scanning light.

The scanning range and scanning position of the scanning light change depending on the deflection angle of the mirror part. Accordingly, it is necessary to detect the deflection angle of the mirror part for properly controlling the scanning light in the scanning range.

An optical scanning apparatus in JP P2006-243225A comprises an optical sensor in an emission direction of the reflected light when the mirror part reaches an end portion of a deflection range. Thereby, the reflected light is detected by the optical sensor when the mirror part has a predetermined deflection angle at the end portion of the deflection range.

In an optical scanning apparatus in JP P2011-18178A, a reflection surface of the mirror part is formed by a diffraction grating. In the optical scanning apparatus, a zero-order diffraction light emitted from the mirror part is used as the scanning light for the original use purpose. Meanwhile, a first-order diffraction light enters a light receiving element, and is used for the detection of the deflection angle.

The optical scanning apparatus in JP P2006-243225A can detect the deflection angle of the mirror part, only when the reflected light reaches the end portion of the deflection width.

The optical scanning apparatus in JP P2011-18178A can detect various arbitrary deflection angles of the mirror part from the intensity of the first-order diffraction light. However, the direction of the emission of the first-order diffraction light from the optical deflector changes depending on the deflection angle of the mirror part. Accordingly, for detecting each deflection angle in the deflection width of the mirror part, the optical sensor needs to have a length corresponding to the deflection width of the first-order diffraction light, leading to increase in length.

SUMMARY OF THE INVENTION

An object of the present invention is to provide an optical deflector and an optical scanning apparatus that can detect an arbitrary deflection angle of the mirror part while avoiding the increase in the length of the optical sensor for the detection of the deflection angle.

An optical deflector of the present invention comprises:
a mirror part that has a flat reflection surface and a grooved reflection surface, each of the flat reflection surface and the grooved reflection surface reflecting an incident light; and
a first actuator that reciprocally turns the mirror part about a first rotation axis, wherein
the grooved reflection surface has a plurality of longitudinal grooves that extends parallel to the first rotation axis, and
each longitudinal groove has a facing inclination surface that is parallel to the first rotation axis and that has at least an opening-side portion of a facing inclination surface of a V-groove.

According to the present invention, the optical deflector comprises the grooved reflection surface on the mirror part, and emits a two-time reflected light from the grooved reflection surface. The emission direction of the two-time reflected light about the first rotation axis is fixed regardless of the deflection angle of the mirror part about the first rotation axis. Further, two-time reflected lights from the longitudinal grooves of the grooved reflection surface interfere with each other, and therefore the intensity of the two-time reflected light changes depending on the deflection angle of the mirror part.

Thus, it is possible to detect an arbitrary deflection angle of the mirror part while avoiding the increase in the length of the optical sensor for the detection of the deflection angle.

Preferably, in the optical deflector of the present invention, both facing inclination surfaces of the V-groove may have inclination angles that are equal to each other with respect to a reference bottom plane, the reference bottom plane passing through a trough line of the V-groove and being parallel to the flat reflection surface.

According to this configuration, it is possible to increase the intensity of the two-time reflected light.

Preferably, in the optical deflector of the present invention, the facing inclination surfaces of the longitudinal groove may have a shape in which a bottom portion of the V-groove is cut off.

According to this configuration, the facing inclination surfaces of the longitudinal groove form the shape in which a bottom portion of the V-groove is cut off. Thereby, it is possible to restrain the generation of a three-time reflected light, and to prevent the three-time reflected light from overlapping the two-time reflected light and obstructing the detection of the deflection angle of the mirror part by the two-time reflected light.

Preferably, in the optical deflector of the present invention,
a cut plane that passes through the V-groove parallel to the flat reflection surface at an intermediate position in a depth direction of the V-groove may be defined,
the facing inclination surface of the V-groove may be divided along the cut plane into an opening-side portion and a closing-side portion, the opening-side portion being a portion on an opening side of the V-groove, the closing-side portion being a portion on a closing side of the V-groove,
lengths of the opening-side portion and the closing-side portion on a transverse section of the V-groove may be Da and Db respectively,
the inclination angle of the V-groove with respect to the reference bottom plane may be $\beta$,
the cut plane may satisfy a condition of $Da:Db=|\tan(2\cdot\beta)|:|\tan(\beta)|$, and
the facing inclination surface of the longitudinal groove may have a shape in which the closing-side portion is cut off from the V-groove, as the shape in which the bottom portion of the V-groove is cut off.

According to this configuration, it is possible to clearly show the position where the bottom portion of the V-groove is cut off.

Preferably, in the optical deflector of the present invention, the sum of the inclination angles of both facing inclination surfaces of the V-groove with respect to the reference bottom surface may be in a range of 80° to 120°.

According to this configuration, it is possible to increase the intensity of the two-time reflected light.

Preferably, in the optical deflector of the present invention, the mirror part may have the flat reflection surface and the grooved reflection surface on a surface of a common substrate layer formed of a crystal layer of silicon, and Miller indices of a principal surface of the crystal layer and the facing inclination surface of the longitudinal groove may be one and the other of (100) and (111) respectively.

According to this configuration, it is possible to easily produce the facing inclination surface having a desired inclination angle, using Miller indices of crystal planes of silicon, while securing the flat reflection surface and the grooved reflection surface that have suitable mirror surfaces.

Preferably, in the optical deflector of the present invention, the inclination angle of each facing inclination surface with respect to the reference bottom plane may be 54.7°.

According to this configuration, it is possible to simplify the formation of a desired inclination angle, by setting the inclination angle of each facing inclination surface with respect to the reference bottom plane to the intersection angle between (100) and (111) that are Miller indices of the silicon crystal layer.

Preferably, in the optical deflector of the present invention, the grooved reflection surface may be provided on the first rotation axis, and the first actuator may be a piezoelectric actuator, an electrostatic actuator or an electromagnetic actuator.

According to this configuration, it is possible to equalize the intensity of the two-time reflected light when the mirror part is deflected to one side with respect to the front face of the optical deflector and the intensity of the two-time reflected light when the mirror part is deflected to the other side.

Preferably, in the optical deflector of the present invention, the grooved reflection surface may be provided at a central portion of the mirror part.

According to this configuration, it is possible to downsize the grooved reflection surface.

An optical scanning apparatus of the present invention comprises:

the above-described optical deflector;

an optical source that generates the incident light, the incident light entering the mirror part; and an optical sensor that receives a two-time reflected light, the two-time reflected light being emitted after the incident light is reflected in the longitudinal groove of the grooved reflection surface of the mirror part two times.

According to the optical scanning apparatus of the present invention, it is possible to detect an arbitrary deflection angle of the mirror part while avoiding the increase in the length of the optical sensor for the detection of the deflection angle.

Preferably, in the optical scanning apparatus, the optical sensor may be provided on both sides of a perpendicular reference plane that passes through a center of the mirror part perpendicularly to the flat reflection surface when the mirror part has a central deflection angle in a deflection width about the first rotation axis.

According to this configuration, it is possible to properly detect the deflection angle even when the mirror part is deflected to one side with respect to the center in the deflection width about the first rotation axis.

Preferably, in the optical scanning apparatus of the present invention, the optical deflector may comprise a second actuator that reciprocally turns the mirror part about a second rotation axis orthogonal to the first rotation axis, and the optical sensor may extend along a scanning trajectory of scanning of the two-time reflected light from the mirror part when the mirror part is reciprocally turned about the second rotation axis.

According to this configuration, with the optical sensor, it is possible to properly detect the deflection angle of the mirror pan about the first rotation axis in a two-axis scanning type optical deflector.

Another optical deflector of the present invention comprises:

a mirror part that has a flat reflection surface and a grooved reflection surface, each of the flat reflection surface and the grooved reflection surface reflecting an incident light;

a first actuator that reciprocally turns the mirror part about a first rotation axis; and a second actuator that reciprocally turns the mirror part about a second rotation axis orthogonal to the first rotation axis, wherein the grooved reflection surface has a plurality of longitudinal grooves that extends parallel to the second rotation axis, and each longitudinal groove has a facing inclination surface that is parallel to the second rotation axis and that has at least an opening-side portion of a facing inclination surface of a V-groove.

According to the present invention, in a two-axis scanning type optical deflector, it is possible to detect an arbitrary deflection angle of the mirror part about the second rotation axis, using the two-time reflected light from the grooved reflection surface.

Preferably, in another optical deflector of the present invention, both facing inclination surfaces of the V-groove may have inclination angles that are equal to each other with respect to a reference bottom plane, the reference bottom plane passing through a trough line of the V-groove and being parallel to the flat reflection surface, the facing inclination surface of the longitudinal groove may have a shape in which a bottom portion of the V-groove is cut off, a cut plane that passes through the V-groove parallel to the flat reflection surface at an intermediate position in a depth direction of the V-groove may be defined, the facing inclination surface of the V-groove may be divided along the cut plane into an opening-side portion and a closing-side portion, the opening-side portion being a portion on an opening side of the V-groove, the closing-side portion being a portion on a closing side of the V-groove, lengths of the opening-side portion and the closing-side portion on a transverse section of the V-groove may be Da and Db respectively, the inclination angle of the V-groove with respect to the reference bottom plane may be $\beta$, the cut plane may satisfy a condition of Da:Db=|tan(2·$\beta$)|:|tan($\beta$)|, and the facing inclination surface of the longitudinal groove may have a shape in which the closing-side portion is cut off from the V-groove, as the shape in which the bottom portion of the V-groove is cut off.

According to this configuration, in the detection of the deflection angle of the mirror part about the second rotation axis, it is possible to avoid the three-time reflected light from overlapping the two-time reflected light. Further, it is possible to clearly show the position where the bottom part of the V-groove is cut off.

An another optical scanning apparatus of the present invention comprises:

another optical deflector;

an optical source that generates the incident light, the incident light entering the mirror part; and an optical sensor that receives a two-time reflected light, the two-time reflected light being emitted after the incident light is reflected in the longitudinal groove of the grooved reflection surface of the mirror part two times, the optical sensor extending along a scanning trajectory of scanning of the two-time reflected light when the mirror part is reciprocally turned about the first rotation axis.

According to the present invention, in a two-axis scanning type optical scanning apparatus, it is possible to detect an arbitrary deflection angle of the mirror part about the second rotation axis while avoiding the increase in the length of the optical sensor for the detection of the deflection angle.

Preferably, in the optical scanning apparatus of the present invention, the optical sensor may be provided on both sides of the optical deflector in a direction of the second rotation axis.

According to this configuration, it is possible to properly detect the deflection angle even when the mirror part is deflected to one side with respect to the center of the deflection angle range about the second rotation axis.

BRIEF DESCRIPTION OF THE DRAWINGS

The embodiments herein will be better understood from the following detailed description with reference to the drawings, in which:

FIG. 3A is an explanatory diagram of a one-time reflected light;

FIG. 3B is an explanatory diagram of a two-time reflected light and a three-time reflected light;

FIG. 5 is a graph showing the relation of the deflection angle of a mirror part 30 and the emission angle of each reflected light from longitudinal grooves;

FIG. 6A is a graph showing the relation of a difference angle between inclination angles of facing inclination surfaces with respect to a groove center plane of the mirror part and a relative reflected light intensity for a two-time reflected light having a negative emission angle;

FIG. 6B is a graph showing the relation of the difference angle between inclination angles of both facing inclination surfaces with respect to the groove center plane of the mirror part and the relative reflected light intensity for a two-time reflected light having a positive emission angle;

FIG. 7A is a graph showing the relation of the total angle of inclination angles of both facing inclination surfaces with respect to a reference plane and the relative reflected light intensity for a two-time reflected light having an emission angle smaller than 0°;

FIG. 7B is a graph showing the relation of the total angle of inclination angles of both facing inclination surfaces with respect to the reference plane and the relative reflected light intensity for a two-time reflected light having an emission angle equal to or larger than 0°;

FIG. 8A is an explanatory diagram of the interference of the two-time reflected light when the mirror part has a deflection angle equal to 0°;

FIG. 8B is an explanatory diagram of the interference of the two-time reflected light when the mirror part has a deflection angle larger than 0°;

FIG. 9 is a diagram showing the relation of the deflection angle, the phase difference (inclination line) and the intensity (longitudinal bar) of a two-time reflected light L2 when the combination of the lateral pitch of longitudinal grooves on a grooved reflection surface and the wavelength of the incident light is variously altered;

DETAILED DESCRIPTION OF PREFERRED EMBODIMENT

Figure 1:
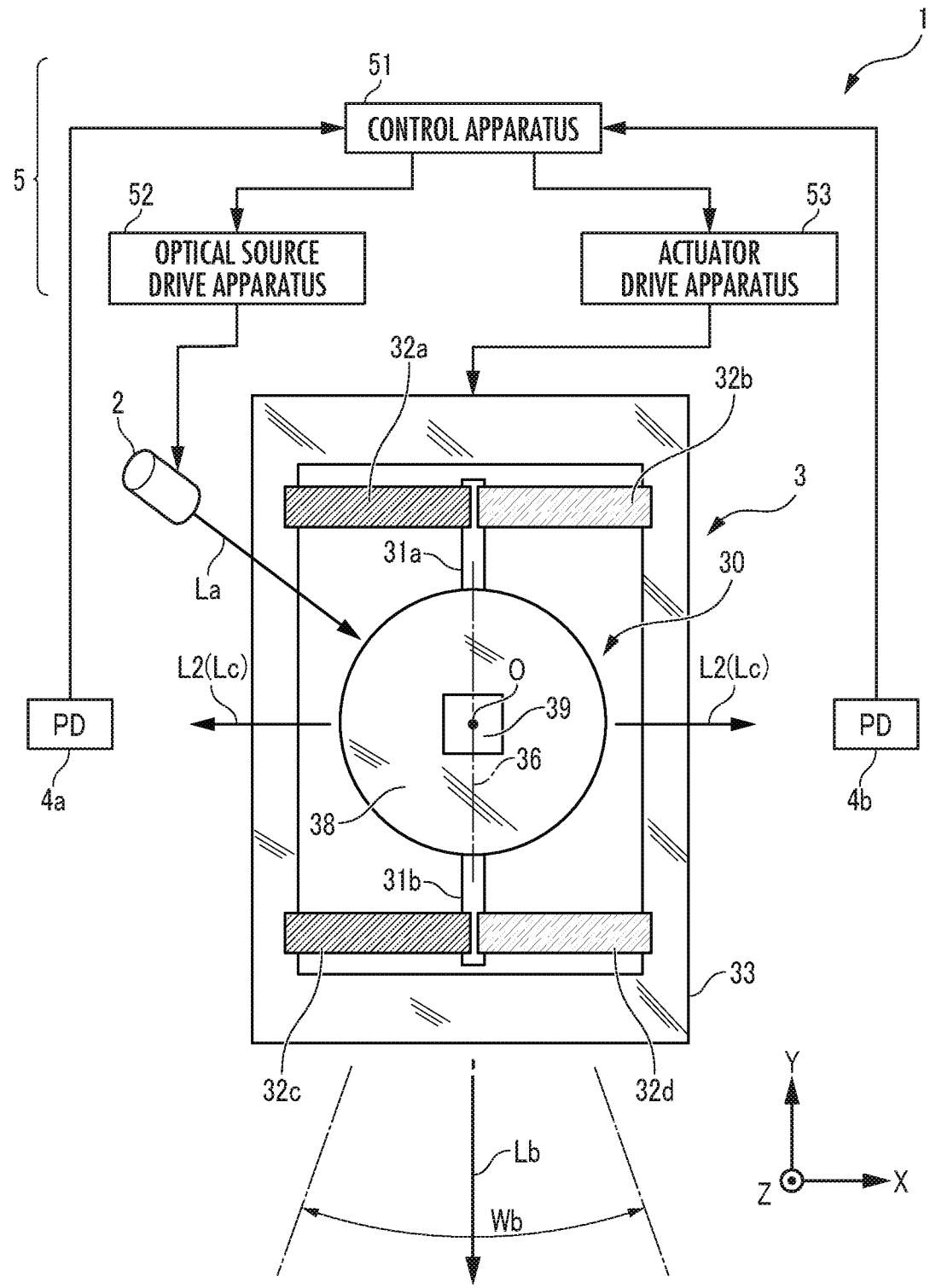
FIG. 1 is a configuration diagram of a single-axis (single-dimensional) scanning type optical scanning apparatus.

Preferred embodiments of the present invention will be described below. Naturally, the present invention is not limited to the embodiments described below. The present invention can be carried out as various embodiments within the scope of the technical idea disclosed in the specification. In the embodiments, common constituent elements are denoted by identical reference characters.

[Single-Axis Scanning Type Optical Scanning Apparatus]

FIG. 1 is a configuration diagram of a single-axis (single-dimensional) scanning type optical scanning apparatus 1. The optical scanning apparatus 1, as a single-axis scanning type optical scanning apparatus, comprises a single-axis scanning type optical deflector 3. In addition to the optical deflector 3, the optical scanning apparatus 1 includes an optical source 2, optical sensors 4a, 4b and a control unit 5.

Figure 2:
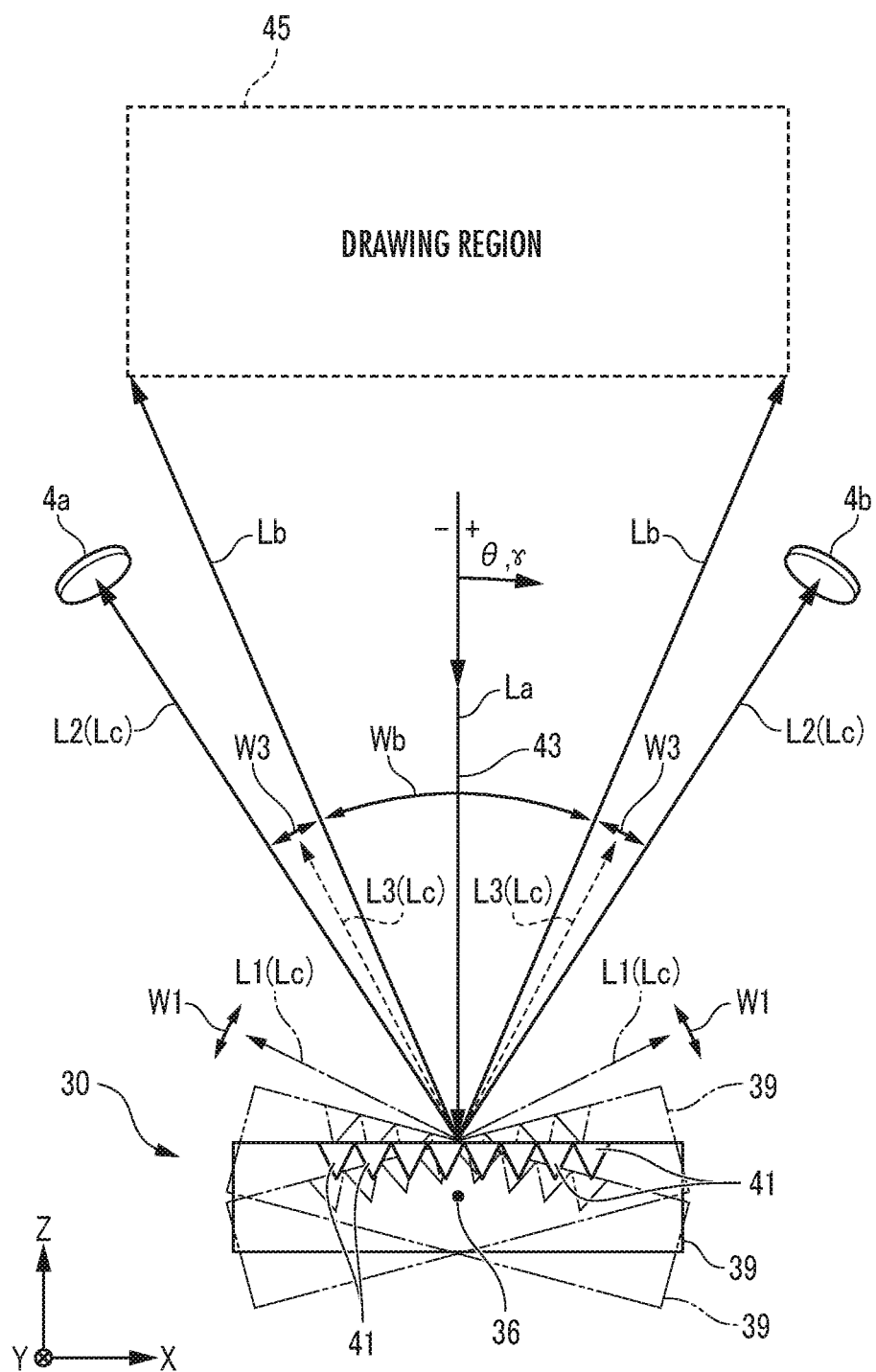
FIG. 2 is an explanatory diagram of a detection light.

For example, the optical source 2 is a laser source. The optical source 2 emits a light La. The light La enters a front surface of a mirror part 30, as an incident light of the optical deflector 3. In this example, the front surface of the circular mirror part 30 is constituted by a flat reflection surface 38 that occupies a great portion and a square grooved reflection surface 39 that occupies a small central portion containing a center O. The light that is of the light La and that enters the flat reflection surface 38 is emitted from the flat reflection surface 38, as a scanning light Lb. The light that is of the light La and that enters the grooved reflection surface 39 is emitted from the grooved reflection surface 39, as a detection light Lc. The detection light Lc includes a one-time reflected light L1, a two-time reflected light L2 and a three-time reflected light L3 (FIG. 2).

The optical sensors 4a, 4b are disposed on both sides of the optical deflector 3, so as not to be on the optical path of the scanning light Lb. The optical sensors 4a. 4b receive the two-time reflected light L2 emitted from the optical deflector 3 to both sides. The two-time reflected light L2 will be described in detail with FIG. 2.

The control unit 5 comprises a control apparatus 51, an optical source drive apparatus 52 and an actuator drive apparatus 53. The optical source drive apparatus 52 and the actuator drive apparatus 53 drive the optical source 2 and an actuator 32 of the optical deflector 3 respectively. For the optical source 2, by the drive from the optical source drive apparatus 52, the lighting-up, the lighting-off and the light intensity at the time of the lighting-up are controlled. By the drive from the actuator drive apparatus 53, the actuator 32 of the optical deflector 3 controls the reciprocal turning of the mirror pan 30 about a rotation axis 36. The control apparatus 51 synchronously controls the drive of the optical source 2 and the drive of the actuator 32, based on detection signals from the optical sensors 4.

The single-axis scanning type optical deflector 3 is the same as a known single-axis type piezoelectric optical deflector (e.g. JP P2014-056020A), except the mirror part 30. Accordingly, the optical deflector 3 will be briefly described. A three-axis orthogonal coordinate system with an X-axis, a Y-axis and a Z-axis is defined for convenience of the description of the configuration of the optical deflector 3.

The rotation axis 36 passes through the center O of the mirror part 30, and extends in the Y-axis direction. A torsion bar 31a and torsion bar 31b extend out of sides of the mirror part 30 along the rotation axis 36. Each of actuators 32a to 32d extends in the X-axis direction. The actuators 32a, 32b are disposed on both sides of the torsion bar 31a in the X-axis direction, and are interposed between the torsion bar 31a and a support frame 33. The actuators 32c, 32d are disposed on both sides of the torsion bar 31b in the X-axis direction, and are interposed between the torsion bar 31b and a support frame 33.

For example, sizes of portions of the mirror part 30 are as follows. The mirror part 30 has a circular shape of 1 mmϕ to 2 mmϕ. The grooved reflection surface 39 has a square shape, and the length of a side is several tens of micrometers to several hundreds of micrometers.

The actuator 32 reciprocally turns a portion joined to the torsion bar 31 about the rotation axis 36. Thereby, the torsional vibration of the torsion bar 31 is transmitted to the mirror part 30, and the mirror part 30 is reciprocally turned about the rotation axis 36 at a predetermined resonance frequency. As a result, the scanning light Lb is reciprocally displaced in a deflection width Wb.

[Detection Light]

FIG. 2 is an explanatory diagram of the detection light Lc. Hereinafter, for convenience of description, a deflection angle θ of the mirror part 30 about the rotation axis 36 and an emission angle γ of the scanning light Lb and detection light Lc from the optical deflector 3 are defined. "Mirror perpendicular plane" is defined as a plane that contains the rotation axis 36 and that is perpendicular to the flat reflection surface 38. A mirror perpendicular plane 43 in FIG. 2 is defined as a mirror perpendicular plane when the mirror part 30 faces the front.

In the single-axis type optical deflector 3, the deflection angle θ of the mirror part 30 is defined as the inclination angle of the mirror perpendicular plane with respect to the mirror perpendicular plane 43. The emission angle γ is defined as the emission angle of the scanning light Lb and the detection light Lc with respect to the mirror perpendicular plane 43. For each of the deflection angle θ and the emission angle γ, the + side and − side of the X-axis with respect to the mirror perpendicular plane 43 are defined as the + side and the − side respectively.

The grooved reflection surface 39 has a plurality of longitudinal grooves 41 whose longitudinal direction is parallel to the rotation axis 36. The longitudinal groove 41 is formed as a V-groove. That is, the longitudinal groove 41 contains the whole of the V-groove. Meanwhile, a longitudinal groove 71 (FIG. 11) described later is formed as a portion of the V-groove in which a bottom portion is cut off from the whole of the V-groove. The whole of the V-groove naturally contains the portion of the V-groove, and therefore each of the longitudinal grooves 41, 71 has a common structure of comprising a facing inclination surface that has at least an opening-side portion of a facing inclination surface of the V-groove.

Each longitudinal groove 41 has facing inclination surfaces 42a, 42b. The facing inclination surfaces 42a, 42b are also the facing inclination surfaces of the V-groove, and are joined to each other at a bottom edge corresponding to a closing edge of the V-groove, so as to form a trough line.

The detection light Lc is classified into the one-time reflected light L1, the two-time reflected light L2 and the three-time reflected light L3, according to the number of reflections in the longitudinal groove 41. As described later in detail, the emission angles γ of the one-time reflected light L1 and the three-time reflected light L3 vary in the deflection widths W1, W3, with the reciprocal turning of the mirror part 30 about the rotation axis 36. Meanwhile, the emission angle γ of the two-time reflected light 12 has a deflection width of 0, and is fixed regardless of the deflection angle θ of the mirror part 30 about the rotation axis 36.

In FIG. 2, the scanning light Lb is a light that is emitted from the mirror part 30 by the reflection of the light La on the flat reflection surface 38 of the mirror part 30. The scanning light Lb performs scanning in the X-axis direction on a drawing region 45 that is set on a screen or the like. Since the mirror part 30 is reciprocally turned about the rotation axis 36 as the single axis, the scanning of the scanning light Lb on the drawing region 45 is a single-dimensional scanning.

FIG. 3A is an explanatory diagram of the one-time reflected light L1. FIG. 3B is an explanatory diagram of the two-time reflected light L2 and the three-time reflected light L3. Each of FIG. 3A, FIG. 3B and FIG. 4 described later illustrates a longitudinal groove 41 that is of the plurality of longitudinal grooves 41 arrayed in the lateral direction and that is formed on the front surface side of the rotation axis 36. Each of FIG. 3A and FIG. 3B shows only light that is of the light La and that enters the facing inclination surface 42a. The one-time reflected light L1, two-time reflected light L2 and three-time reflected light L3 derived from the light La that enters the facing inclination surface 42b are emitted in directions symmetrical to emission directions of the one-time reflected light L1, two-time reflected light L2 and three-time reflected light L3 in FIG. 3A and FIG. 3B.

A groove center plane 47 is defined as a plane that contains the trough line of the longitudinal groove 41 and that is perpendicular to the plane of the flat reflection surface 38. The groove center plane 47 is defined for each longitudinal groove 41, and is parallel to the mirror perpendicular plane 43 when the deflection angle θ of the mirror part 30 is 0.

In FIG. 3A, inclination angles αa, αb are shown as intersection angles between the facing inclination surfaces 42a, 42b with respect to the groove center plane 47. The inclination angles αa, αb will be described later with FIG. 6A and the like.

Figure 10:
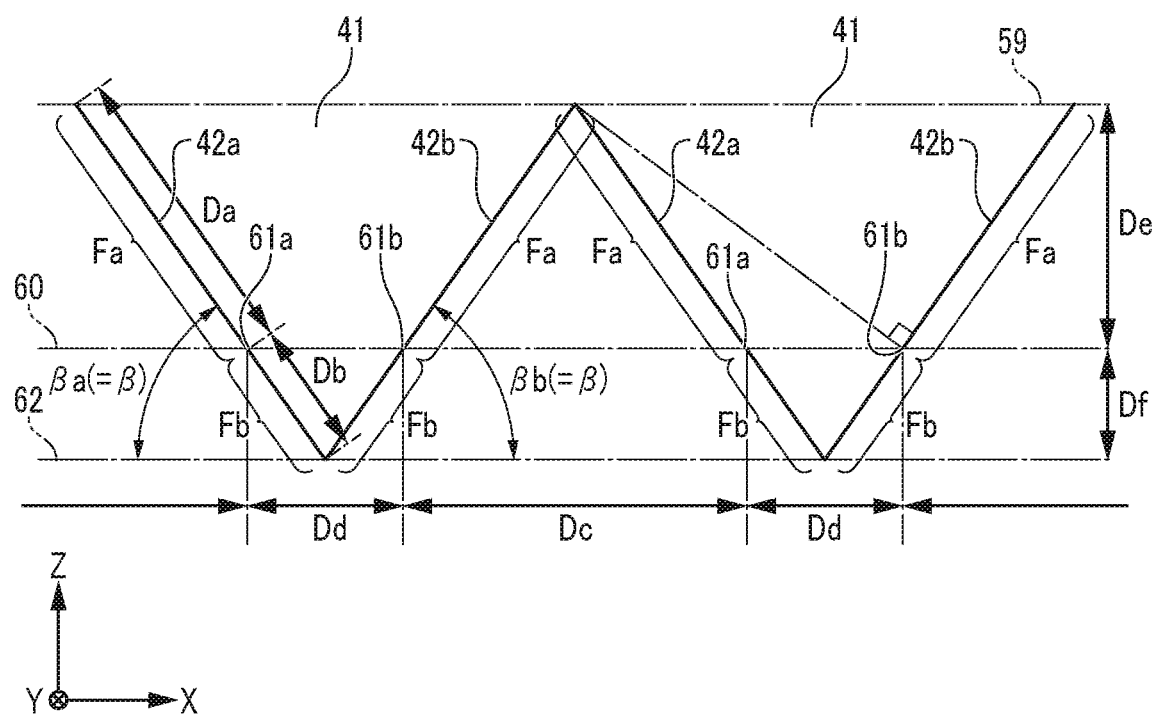
FIG. 10 is an explanatory diagram about a prevention measure for a three-time reflected light.

As inclination angles of the facing inclination surfaces 42a, 42b, inclination angles βa, βb are defined (see FIG. 10), in addition to the inclination angles αa, αb. The inclination angles βa, βb are inclination angles of the facing inclination surfaces 42a, 42b with respect to a trough bottom plane 62 (FIG. 10). When the inclination angles αa, αb are collectively referred, an inclination angle α is used. When the inclination angles βa, βb are collectively referred, an inclination angle β is used. There is a relation of the inclination angle α+the inclination angle β=90°. For discrimination between the inclination angle α and the inclination angle β, when necessary, the inclination angle α and the inclination angle β are referred to as an inner angle side inclination angle and an outer angle side inclination angle respectively.

The one-time reflected light L1 (FIG. 3A) is reflected one time by the facing inclination surface 42a, and thereafter is emitted from the longitudinal groove 41 to the + side in the X-axis direction. The two-time reflected light L2 (FIG. 3B) is reflected in the longitudinal groove 41 two times by the facing inclination surface 42a and the facing inclination surface 42b in this order, and thereafter is emitted from the longitudinal groove 41 to the − side in the X-axis direction. The three-time reflected light L3 (FIG. 3B) is reflected in the longitudinal groove 41 three times by the facing inclination surface 42a, the facing inclination surface 42b and the facing inclination surface 42a in this order, and thereafter is emitted from the longitudinal groove 41 to the − side in the X-axis direction.

As a supplement, suppose that the facing inclination surface 42a is divided into three segments of a first segment, a second segment and a third segment in order from an opening edge to a closing edge in the longitudinal groove 41. In this case, the one-time reflected light L1 is the reflected light of the light La that enters the first segment. The two-time reflected light L2 is the reflected light of the light La that enters the second segment. The three-time reflected light L3 is the reflected light of the light La that enters the third segment.

Figure 4:
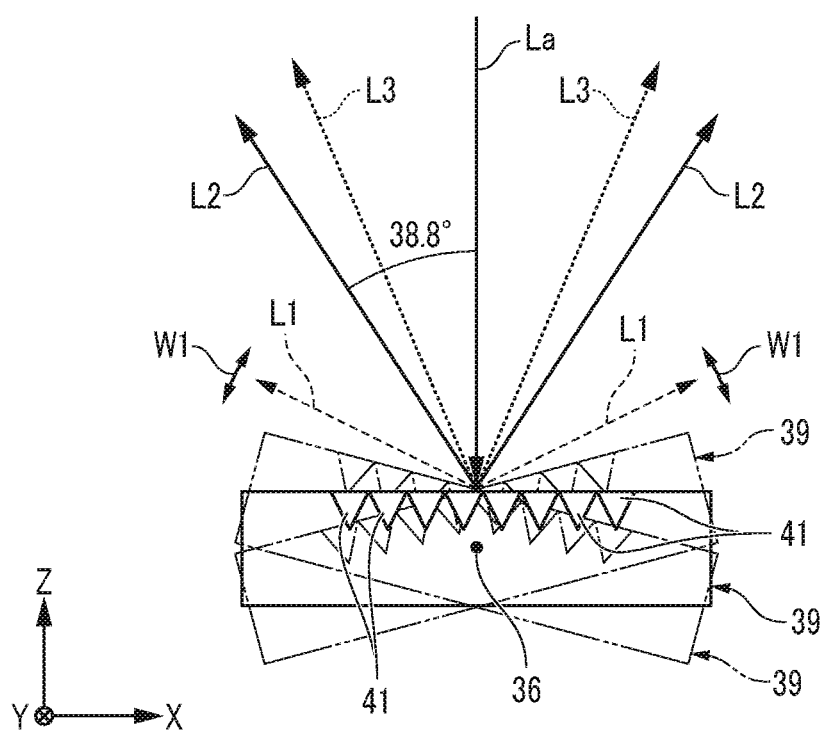
FIG. 4 is a diagram showing the relation of the deflection angle of a mirror part about a rotation axis and the emission angle of each reflected light.

FIG. 4 shows the relation of the deflection angle θ of the mirror part 30 about the rotation axis 36 and the respective emission angles γ of the one-time reflected light L1, the two-time reflected light L2 and the three-time reflected light L3. As an example, a case where the outer angle side inclination angles βa, βb of the V-groove is 54.7° is shown. The emission angles γ of the one-time reflected light L1 and the three-time reflected light L3 from the optical deflector 3 changes in the deflection widths W1, W3, due to the reciprocal turning of the mirror part 30 about the rotation axis 36. Meanwhile, the emission angle γ of the two-time reflected light L2 from the optical deflector 3 is fixed at 38.8°, despite the reciprocal turning of the mirror part 30 about the rotation axis 36.

[Two-Time Reflected Light]

FIG. 5 is a graph showing the relation of the deflection angle θ of the mirror part 30 and the emission angles γ of the reflected lights L1 to L3 from the optical deflector 3. In FIG. 5, the broken line, the solid line and the dotted line show relations for the one-time reflected light L1, the two-time reflected light L2 and the three-time reflected light L3, respectively. The one-time reflected light L1 and the three-time reflected light L3 change depending on the deflection angle θ. Meanwhile, the absolute value of the emission angle γ of the two-time reflected light L2 is fixed at about 38.8°, for both the two-time reflected light L2 on the − side and the two-time reflected light L2 on the + side.

FIG. 6A and FIG. 6B are graphs showing the relation of a difference angle $\Delta\alpha(=|\alpha a - \alpha b|)$ between the inclination angles αa, αb (FIG. 3A) of the facing inclination surfaces 42a, 42b with respect to the groove center plane 47 and a relative reflected light intensity Ir, for various deflection angles θ. As an example, a case of βa+βb=110° is shown. The relative reflected light intensity Ir means a rate when the maximum intensity of the two-time reflected light L2 is 1. FIG. 6A and FIG. 6B show characteristics of the two-time reflected light L2 on the + side and the − side respectively.

From FIG. 6A and FIG. 6B, it is found that the relative intensity of the two-time reflected light L2 over the deflection width of the mirror part 30 can be increased in the case of Δα=0°.

FIG. 7A and FIG. 7B show the relation of a total angle αt (=αa+αb) when the inclination angles αa, αb of the facing inclination surfaces 42a, 42b with respect to the groove center plane 47 are equalized (αa=αb) and the relative reflected light intensity Ir. FIG. 7A shows a characteristic of the two-time reflected light L2 on the − side. FIG. 7B shows a characteristic of the two-time reflected light L2 on the + side.

From FIG. 7A and FIG. 7B, it is found that a range of αt=80° to 120°, particularly, a range of about 100° to about 110° is advantageous in the increase in the relative intensity of the two-time reflected light L2 when the mirror part 30 is deflected in a symmetrical manner with respect to the mirror perpendicular plane 43.

FIG. 8A and FIG. 8B are explanatory diagrams of the interference of the two-time reflected light L2. An opening plane 59 is defined as a plane that contains ridge lines as upper edges of all longitudinal grooves 41 of the grooved reflection surface 39. The trough bottom plane 62 is defined as a plane that contains trough bottoms as lower edges of all longitudinal grooves 41 of the grooved reflection surface 39. The deflection angle θ of the grooved reflection surface 39 is 0° in FIG. 8A, and is θ1 (>0°) in FIG. 8B.

Each of the inclination angles αa, αb of the facing inclination surfaces 42a, 42b with respect to the groove center plane 47 is 35.3° (=90°−54.7°). The reason is because the inclination angles αa, αb of 35.3° can be easily obtained by using the crystal orientation of silicon. The inclination angle α=35.3° means the inclination angle β=54.7°.

That is, when the optical deflector 3 is produced from a silicon substrate, the Miller indices of the principal surface of the normal silicon substrate are (100). The silicon crystal has crystal planes of (100) and (111), and the intersection angle between (100) and (111) is 54.7°. Accordingly, by treating the surface of the silicon substrate by anisotropic etching, it is possible to easily produce the longitudinal groove 41 having the facing inclination surface 42 with the inclination angle β=54.7°.

Specifically, for example, an alkaline aqueous solution such as KOH (potassium hydroxide), TMAH (tetramethylammonium hydroxide) and EDP (ethylenediamine pyrocatechol) is used as the etchant for the anisotropic etching, and thereby the (111) plane for the facing inclination surfaces 42a, 42b can be selectively formed. In the case of using the silicon substrate in which the Miller indices of the principal surface are (100), it is possible to obtain the stable inclination angle β of 54.7°, which is the intersection angle between the (100) plane and the (111) plane.

When the light La enters the longitudinal groove 41 in which the outer angle side inclination angle β of the facing inclination surface 42 is 54.7° parallel to the Z-axis, the emission angle γ of the two-time reflected light L2 from the optical deflector 3 is 38.8° regardless of the deflection angle θ, as described above with FIG. 4.

In FIG. 8A and FIG. 8B, Dp is a pitch that is a regular lateral interval of the longitudinal groove 41 of the grooved reflection surface 39. The two-time reflected light L2 has a property of (a) the emission angle γ from the optical deflector 3 is constant regardless of the deflection angle θ of the mirror part 30, and a property of (b) the intensity of the two-time reflected light L2 that is received by the optical sensor 4 changes depending on the deflection angle θ of the mirror part 30 because the two-time reflected lights L2 from the plurality of longitudinal grooves 41 interfere with each other. For example, the optical sensor 4 is constituted by a PD (Photo Diode). By the property of (a), it is possible to downsize and dispose the optical sensor 4. By the property of (b), it is possible to detect the deflection angle θ of the mirror part 30 from the output of the optical sensor 4.

A phase difference φ (in terms of distance) between the two-time reflected lights L2 from adjacent longitudinal grooves 41 is calculated from Expression 1 in the case of FIG. 8A, and is calculated from Expression 2 in the case of FIG. 8B.

Phase Difference $\varphi = Dp \times \sin(38.8°)$    Expression 1:

Phase Difference $\varphi = Dp \times \sin(38.8° - \theta_1) - Dp \times \sin(\theta_1)$    Expression 2:

The phase difference φ=0 means that the interference between the two-time reflected lights L2 from laterally adjacent longitudinal grooves 41 reaches a peak. It is desirable for the optical sensor 4 to be disposed at a position where the interference reaches a peak. The reason is because the detection accuracy for the deflection angle θ of the mirror part 30 is higher when the intensity of the two-time reflected light L2 is detected at the position where the interference reaches a peak than when the intensity of the two-time reflected light L2 is detected at a position where the interference does not reach a peak. In Expression 2, when the deflection angle θ is ±19.4° (the emission angle γ of the two-time reflected light L2 is 38.4°), the phase difference φ is 0.

[Optical Sensor]

FIG. 9 is a graph showing the relation of the phase difference φ and the deflection angle θ of the mirror part 30 when three combinations of the pitch Dp and a wavelength λ are used as parameters. In each of the three combinations, the inclination angle β of the facing inclination surface 42 is 54.7°. The values of the pitch Dp and the wavelength λ in each combination are as follows.

First Combination: Pitch Dp=5.842 μm. Wavelength λ=450 nm

Second Combination: Pitch Dp=3.000 μm, Wavelength λ=450 nm

Third Combination: Pitch Dp=4.000 μm, Wavelength λ=650 nm

As shown in FIG. 9, in the case of the deflection angle θ=19.4°, the interference reaches a peak in any combination. Accordingly, it is desirable for the optical sensor 4 to be disposed in the direction of the emission angle γ=38.8°.

The optical scanning apparatus 1 comprises two optical sensors 4 in total, on both sides in the X-axis direction. Thereby, it is possible to expand the detection range for the deflection angle θ of the mirror part 30. Furthermore, in the case of the deflection angle θ<0°, the light entering quantity of the light La is larger on the facing inclination surface 42a than on the facing inclination surface 42b, and the light receiving quantity of the two-time reflected light L2 is larger on the optical sensor 4b than on the optical sensor 4a. Conversely, in the case of the deflection angle θ>0°, the light entering quantity of the light La is larger on the facing inclination surface 42b than on the facing inclination surface 42a, and the light receiving quantity of the two-time reflected light L2 is larger on the optical sensor 4a than on the optical sensor 4b.

In consideration of this, in the case of the deflection angle θ<0°, the deflection angle θ may be detected based on the output of the optical sensor 4a, and in the case of the deflection angle θ≥0°, the deflection angle θ may be detected based on the output of the optical sensor 4b. Thereby, it is possible to increase the detection accuracy for the deflection angle θ.

The following method may be adopted instead of switching the optical sensor 4 to be used from the plurality of optical sensors 4 depending on the deflection angle θ. For example, the average of the deflection angles θ detected by the optical sensors 4 is determined as the deflection angle θ that is the final result. Furthermore, the deflection angle θ may be detected from the total of the outputs of the optical sensors 4.

[Measure Against Three-Time Reflected Light]

Next. FIG. 10 is an explanatory diagram about a prevention measure for the three-time reflected light L3. In FIG. 10, the opening plane 59 and the trough bottom plane 62 are defined with FIG. 8A. On the front surface side of the grooved reflection surface 39, a convex portion with an inverse V-shaped section is formed at a regular lateral interval (Dp), by adjacent facing inclination surfaces 42b. 42a between laterally adjacent longitudinal grooves 41. The ridge line of the grooved reflection surface 39 is the tip of the convex portion with that inverse V-shaped section that is formed on the front surface side of the grooved reflection surface 39. The opening plane 59 is a plane that contains the plurality of ridge lines, and is in the same plane as the flat reflection surface 38.

A cut plane 60 is a plane parallel to the opening plane 59, and traverses the facing inclination surfaces 42 at an intermediate position in the depth direction. Intersection lines 61a. 61b are intersection lines between the cut plane 60 and the longitudinal grooves 41a. 41b. Each facing inclination surface 42 is divided along the cut plane 60 into an opening-side portion Fa and a closing-side portion Fb. The first to third segments have been described above with FIG. 3A and FIG. 3B. The opening-side portion Fa corresponds to a segment resulting from combining the first segment and the second segment. The closing-side portion Fb corresponds to the third segment. As described above, the first segment, the second segment and the third segment are segments where the lights La to generate the one-time reflected light L1, the two-time reflected light L2 and the three-time reflected light L3 are firstly reflected, respectively.

Da denotes the length of the opening-side portion Fa on a transverse section of the longitudinal groove 41. Db denotes the length of the closing-side portion Fb on the transverse section of the longitudinal groove 41. Dc denotes the X-axis directional size of an interval between the intersection line 61b and the intersection line 61a that are adjacent in the X-axis direction on the transverse section of the longitudinal groove 41 in the relation of the − side and the + side. Dd denotes the X-axis directional size of an interval between the intersection line 61a and the intersection line 61b that are adjacent in the X-axis direction in the relation of the − side and the + side. De and Df denote the sizes of the opening-side portion Fa and the closing-side portion Fb in the Z-axis direction (the depth direction of the longitudinal groove 41).

There is a relation of Expression 3 among Da to Df. Here, each of the inclination angle βa and the inclination angle βb is β.

$$Da:Db=Dc:Dd=De:Df=|\tan(2\cdot\beta)|:|\tan(\beta)| \quad \text{Expression 3:}$$

Figure 11:
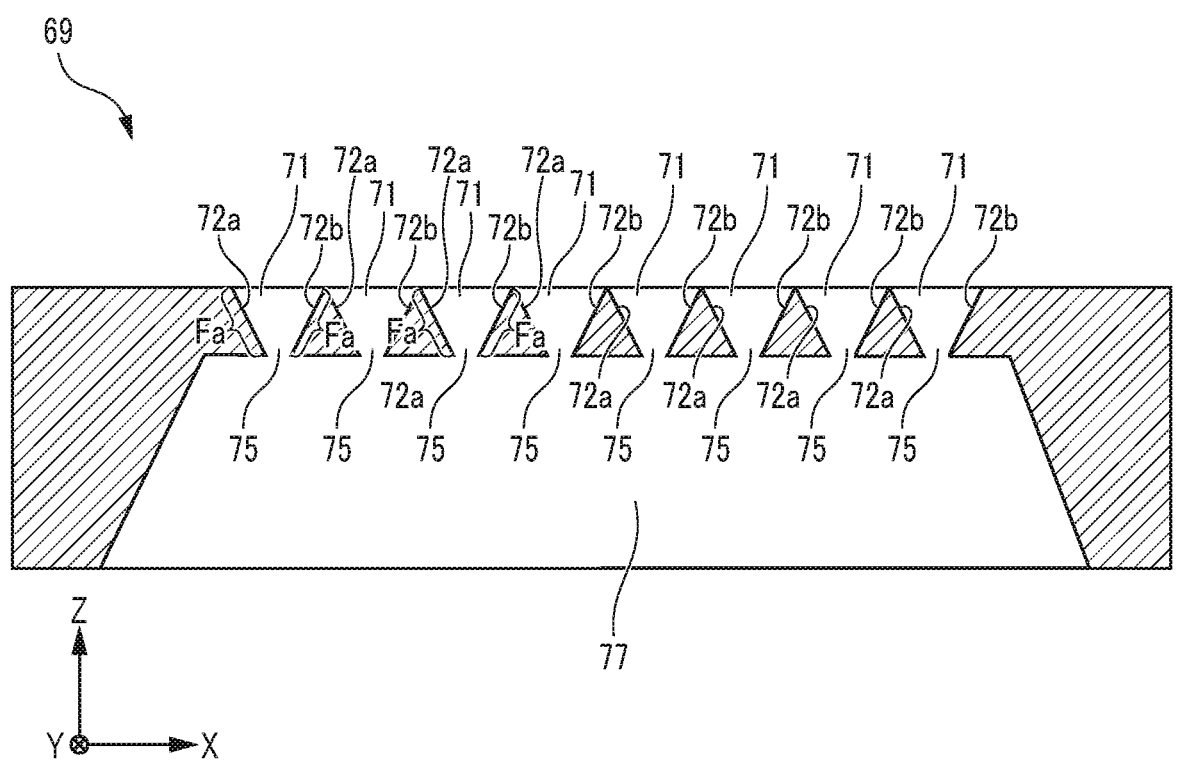
FIG. 11 is a sectional view of the structure of a grooved reflection surface in which a bottom portion of a V-groove is cut off from facing inclination surfaces of the grooved reflection surface in FIG. 8A based on a predetermined expression.

FIG. 11 shows a transverse section of a grooved reflection surface 69 having a measure against the three-time reflected light U. A facing inclination surface 72 of a longitudinal groove 71 of the grooved reflection surface 69 has a structure in which the closing-side portion Fb is eliminated from the facing inclination surface 42 of the longitudinal groove 41 of the grooved reflection surface 39 (FIG. 10) and only the opening-side portion Fa is left.

Similarly to the plurality of longitudinal grooves 41 of the grooved reflection surface 39, the plurality of longitudinal grooves 71 of the grooved reflection surface 69 is arranged such that the longitudinal direction is parallel to the rotation axis 36. The length of the facing inclination surface 72 is set to Da (FIG. 10). Each longitudinal groove 71 has a trough-side opening 75 on the back surface side. A concavity 77 is formed on the back surface side of the grooved reflection surface 69, and the trough-side openings 75 commonly communicate with the concavity 77.

As a result, on the grooved reflection surface 69, the light La that is of the light La and that enters the closing-side portion Fb (the third segment) of the grooved reflection surface 39 (FIG. 3) goes from the trough-side opening 75 to the back surface side of the mirror part 30. Accordingly, on the grooved reflection surface 69, the generation of the three-time reflected light L3 that overlaps the two-time reflected light L2 is inhibited.

[Grooved Reflection Surface with Top Surface]

Figure 12:
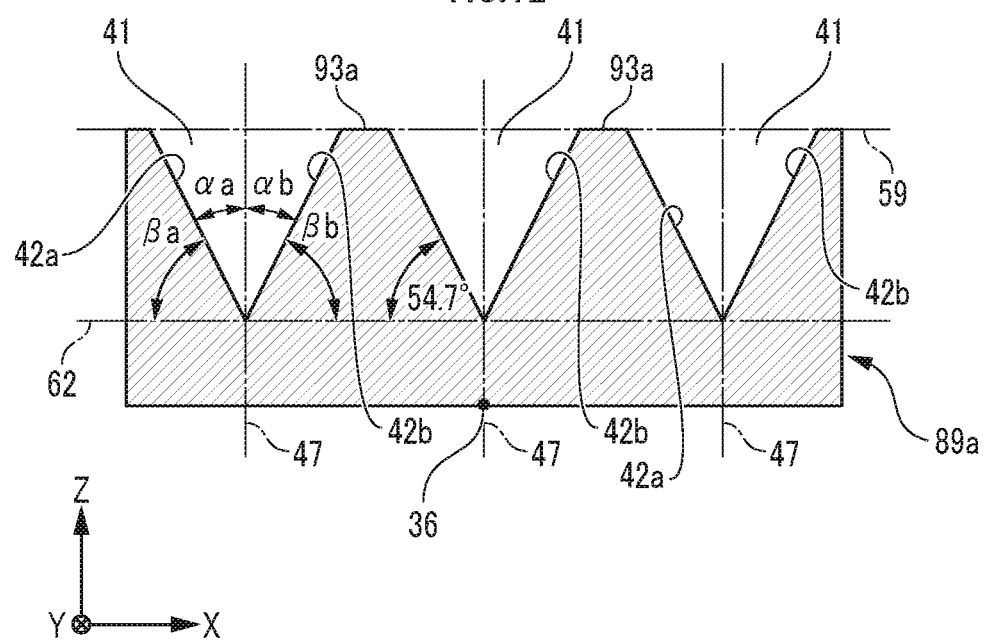
FIG. 12 is a sectional view of a grooved reflection surface in which a part of the structure of the grooved reflection surface in FIG. 8A is altered.

FIG. 12 is a sectional view of a grooved reflection surface 89a in which a part of the structure of the grooved reflection surface 39 in FIG. 8A is altered. Corresponding elements between the grooved reflection surface 89a and the grooved reflection surface 39 are denoted by identical reference characters.

The difference will be described. In the grooved reflection surface 39 in FIG. 8A, upper edges (opening edges) of laterally adjacent longitudinal grooves 41 coincide with each other in the lateral direction (the X-axis direction). Meanwhile, in the grooved reflection surface 89a in FIG. 12, an interval is provided in the lateral direction between the upper edges of laterally adjacent longitudinal grooves 41. As a result, in the grooved reflection surface 89a, a top surface 93a is formed between the upper edges of the laterally adjacent longitudinal grooves 41. The top surface 93a exists on the opening plane 59 (described with FIG. 8A).

Figure 13:
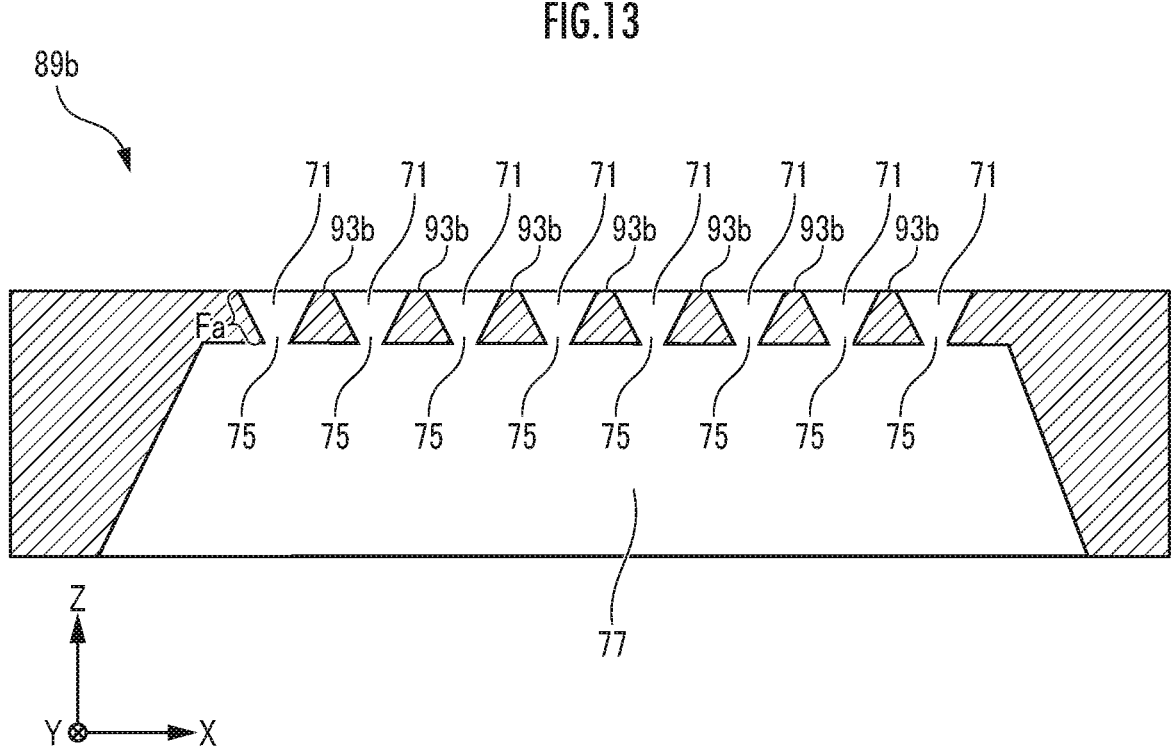
FIG. 13 is a sectional view of a grooved reflection surface in which a part of the structure of the grooved reflection surface in FIG. 11 is altered.

FIG. 13 is a sectional view of a grooved reflection surface 89b in which a part of the structure of the grooved reflection surface 69 in FIG. 11 is altered. Corresponding elements between the grooved reflection surface 89b and the grooved reflection surface 69 are denoted by identical reference characters.

The difference will be described. In the grooved reflection surface 69 in FIG. 11, upper edges (opening edges) of laterally adjacent longitudinal grooves 71 coincide with each other in the lateral direction. Meanwhile, in the grooved reflection surface 89b in FIG. 13, an interval is provided in the lateral direction between the upper edges of laterally adjacent longitudinal grooves 71. As a result, in the grooved reflection surface 89b, a top surface 93b is formed between the upper edges of the laterally adjacent longitudinal grooves 71. The Z-axis directional position of the upper edge of the longitudinal groove 71 in the grooved reflection surface 89b is the same as the Z-axis direction position of the upper edge of the longitudinal groove 71 in the grooved reflection surface 69 in FIG. 11. Accordingly, the length of the opening-side portion Fa of the grooved reflection surface 89b is equal to the length of the opening-side portion Fa of the grooved reflection surface 69.

[Two-Axis Scanning Type Optical Scanning Apparatus]

Figure 14:
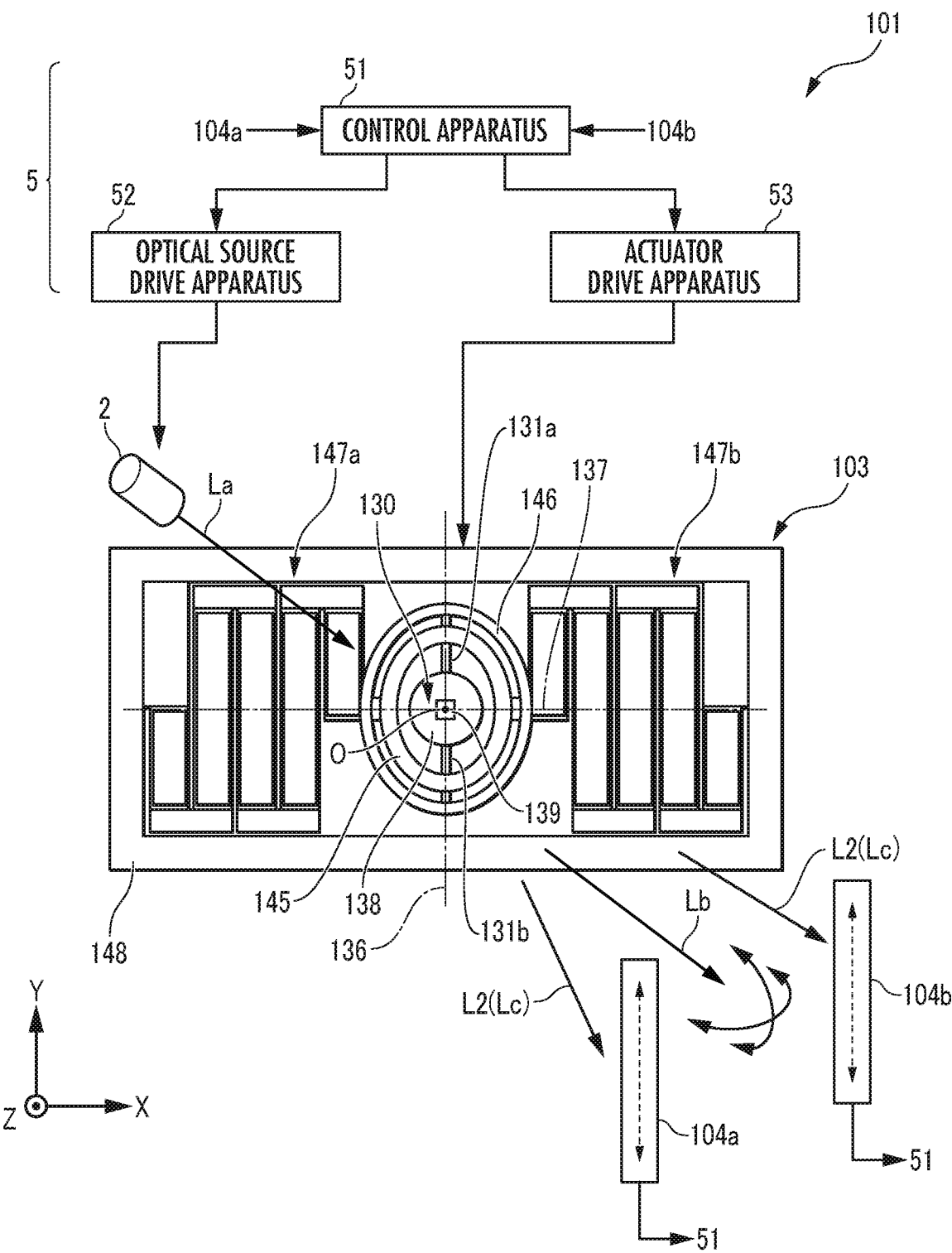
FIG. 14 is a configuration diagram of a two-axis scanning type optical scanning apparatus that can detect the deflection angle of the mirror part about a first rotation axis.

In FIG. 14, a two-axis (two-dimensional) scanning type optical scanning apparatus 101 comprises a two-axis scanning type optical deflector 103, as two-axis scanning type optical scanning apparatus. In the optical scanning apparatus 101, elements in common with the optical scanning apparatus 1 (FIG. 1) are denoted by reference characters identical to the reference characters assigned to the elements of the optical scanning apparatus 1, and descriptions thereof are omitted.

The difference of the optical scanning apparatus 101 from the optical scanning apparatus 1 is that the optical scanning apparatus 101 comprises an optical deflector 103 and an optical sensor 104 instead of the optical deflector 3 and optical sensor 4 of the optical scanning apparatus 1. The optical deflector 103 and the optical sensor 104 will be described below.

The optical deflector 103 has the same configuration as a known two-axis type piezoelectric optical deflector (e.g. JP P2017-207630A), except a mirror part 130. Details of the mirror part 130 will be described later. The structure of the optical deflector 103 will be briefly described.

The optical deflector 103 comprises the mirror part 130, torsion bars 131a. 131b, inner actuators 145a. 145b, a movable frame 146, outer actuators 147a, 147b, and a fixed frame 148.

A first rotation axis 136 and a second rotation axis 137 each are set on the surface of the optical deflector 103, and are orthogonal at the center O of the mirror part 130. The first rotation axis 136 coincides with a central axis line of the torsion bar 131. At the time of the stop of the optical deflector 103, the first rotation axis 136 and the second rotation axis 137 are in the Y-axis direction and the X-axis direction respectively.

The inner actuator 145 performs the torsional vibration of the torsion bar 131 about the first rotation axis 136 at a resonance frequency. Thereby, the mirror part 130 is reciprocally turned about the first rotation axis 136 at a resonance frequency F1. The outer actuator 147 reciprocally turns the movable frame 146 about an axis line parallel to the X-axis, at anon-resonance frequency F2 (F2<F1). Thereby, the mirror part 130 is reciprocally turned about the second rotation axis 137.

Next, the mirror part 130 will be described in detail. The mirror part 130 is reciprocally turned about the two axes of the first rotation axis 136 and the second rotation axis 137, unlike the mirror part 30, but the structure is the same as the structure of the mirror part 30. That is, on the front surface, the mirror part 130 has a flat reflection surface 138 and a grooved reflection surface 139 that are the same as the flat reflection surface 38 and grooved reflection surface 39 of the mirror part 30 respectively.

In the optical scanning apparatus 101, a deflection angle θh is defined as the deflection angle of the mirror part 130 about the first rotation axis 136, and a deflection angle θv is defined as the deflection angle of the mirror part 130 about the second rotation axis 137. As for the emission angles of the scanning light Lb and detection light IL from the mirror part 130, a deflection angle θh is defined as the deflection angle of the mirror part 130 about the first rotation axis 136, and a deflection angle θv is defined as the deflection angle of the mirror part 130 about the second rotation axis 137.

The optical sensors 104a, 104b are disposed so as not to be on the optical path of the scanning light Lb for two-dimensional scanning. Specifically, the optical sensors 104a, 104b are disposed on both sides in the X-axis direction with respect to the emission range of the scanning light Lb. and receive two-time reflected lights L2 on the respective sides in the X-axis direction. Each optical sensor 104 detects the deflection angle θh of the mirror part 130 about the first rotation axis 136.

The mirror part 130 is reciprocally turned about the second rotation axis 137. Accordingly, the two-time reflected light L2 is displaced in the Y-axis direction to perform scanning, due to the reciprocal turning of the mirror part 130 about the second rotation axis 137, though the emission direction of the two-time reflected light L2 from the mirror part 130 is constant regardless of the deflection angle θh of the mirror part 130 about the first rotation axis 136. Therefore, the length of each optical sensor 104 is set such that the optical sensor 104 extends along the scanning trajectory of the two-time reflected light L2 in the Y-axis direction.

[Detection of Non-Resonance Deflection Angle]

Figure 15:
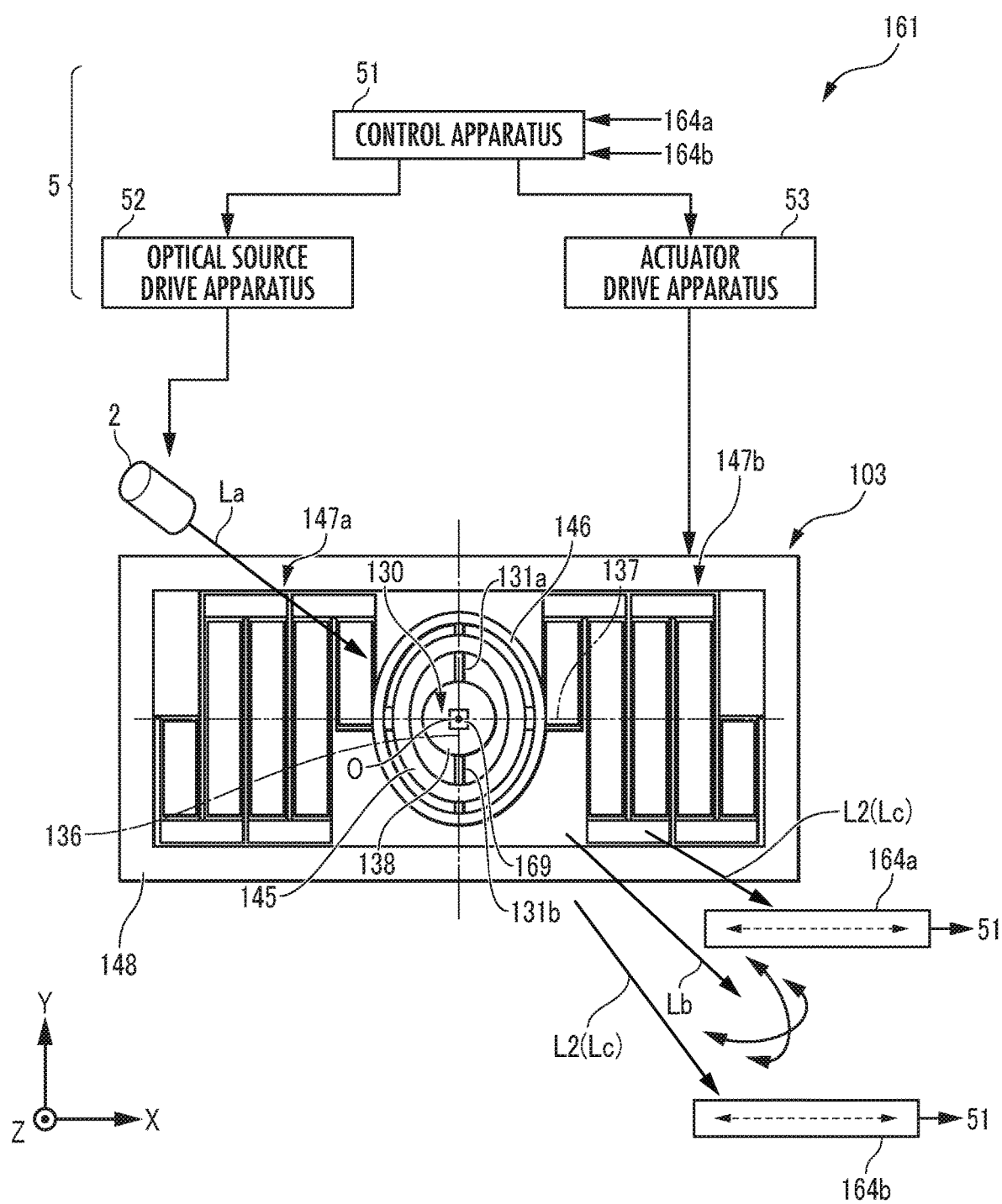
FIG. 15 is a configuration diagram of a two-axis scanning type optical scanning apparatus that can detect the deflection angle of the mirror part about a second rotation axis.

FIG. 15 is a configuration diagram of an optical scanning apparatus 161 in which the optical scanning apparatus 101 in FIG. 14 is modified. The difference of the optical scanning apparatus 161 from the optical scanning apparatus 101 is a grooved reflection surface 169 of the mirror part 130. In the grooved reflection surface 169, the grooved reflection surface 139 of the optical scanning apparatus 101 is rotated by 90° clockwise about a standing line at the center O that is perpendicular to the flat reflection surface 138.

As a result, the two-time reflected light L2 from the grooved reflection surface 169 is emitted to both sides in the Y-axis direction with respect to the emission range of the scanning light Lb that is emitted for two-dimensional scanning.

The optical sensors 164a, 164b are disposed on both sides in the Y-axis direction with respect to the emission range of the scanning light Lb, and receive the two-time reflected lights L2 on the respective sides in the Y-axis direction. The light receiving quantity (or the relative reflected light intensity Ir) of each optical sensor 164 changes depending on the deflection angle θv of the mirror part 130. As a result, the control apparatus 51 detects the deflection angle θv of the mirror part 130 based on the output from each optical sensor 164.

The mirror part 130 is reciprocally turned about the second rotation axis 137. Accordingly, the two-time reflected light L2 is displaced in the X-axis direction to perform scanning, due to the reciprocal turning of the mirror part 130 about the first rotation axis 136, though the emission angle of the two-time reflected light L2 from the mirror part 130 is fixed regardless of the deflection angle θv of the mirror part 130 about the second rotation axis 137. Therefore, the length of each optical sensor 164 is set such that the optical sensor 164 extends along the scanning trajectory of the two-time reflected light L2 in the X-axis direction.

Thus, in the optical scanning apparatus 161, the deflection angle θv of the non-resonance vibration of the mirror part 130 about the second rotation axis 137 is detected from the light receiving quantity (or the relative reflected light intensity Ir) of the two-time reflected light L2 of the optical sensor 164.

[Supplement and Modification]

The first rotation axis in the present invention corresponds to the rotation axis 36 and the first rotation axis 136. The second rotation axis in the present invention corresponds to the second rotation axis 137.

The first actuator in the present invention corresponds to the actuator 32 and the inner actuator 145. The second actuator in the present invention corresponds to the outer actuator 147. The first actuator and second actuator in the embodiment each are piezoelectric actuators, but the first actuator and second actuator in the present invention may be electromagnetic coil actuators or electrostatic actuators.

A specific structure example of the electromagnetic coil actuator is described in detail in the following literature: "A. D. Yalcinkaya, H. Urey, D. Brown, T. Montague. and R. Sprague, "Two-axis electromagnetic microscanner for high resolution displays." J. Microelectromech. Syst., vol. 15, no. 4, pp. 786-794, August 2006." Further, a specific structure example of the electrostatic actuator is described in detail in the following literature: "H. Schenk. P. Durr. D. Kunze, H. Lakner, and H. Kuck, "A resonantly excited 2D-micro-scanning-mirror with large deflection," Sens. Actuators A, Phys., vol. 89, no. 1, pp. 104-111, March 2001."

The first rotation axis direction and second rotation axis direction in the present invention corresponds to the Y-axis direction and X-axis direction in the embodiment.

In the optical deflector 3, 103, only one grooved reflection surface 39, 139 is provided at the central portion, and the optical sensor 4, 104 is provided on both sides of the optical deflector 3, 103. In the present invention, the deflection angle θ of the mirror part 30, 130 may be detected by providing the grooved reflection surface 39, 139 only on one side in the X-axis direction with respect to the center O and providing the optical sensor 4, 104 only on the other side in the X-axis direction with respect to the optical deflector 3, 103. The grooved reflection surface 39, 139 may be provided on both one side and the other side with respect to the center O of the mirror part 30, such that the optical sensor 4 on the other side receives the two-time reflected light L2 from the grooved reflection surface 39, 139 on the one side and the optical sensor 4 on the one side receives the two-time reflected light L2 from the grooved reflection surface 39, 139 on the other side.

In an active layer of SOI that forms the substrate layer of the optical deflector 3, 103, the Miller indices of the principal surface are (100), and the Miller indices of the facing inclination surface 42 are (111). In the optical deflector of the present invention, the Miller indices of the principal surface may be (111) and the Miller indices of the facing inclination surface 42 may be (100), in the silicon crystal layer of the substrate.

The flat reflection surface 38, 138 and the grooved reflection surface 39, 69, 89a, 89b, 139 are formed as a mirror surface layer that covers the common substrate layer of the mirror part 30, 130. For example, the mirror surface layer is constituted by a silicon crystal surface and a metal reflection film or dielectric multilayer film.

The preceding description contains significant detail regarding the novel aspects of the present invention. It is should not be construed, however, as limiting the scope of the invention but rather as providing illustrations of the preferred embodiments of the invention. Thus, the scope of the invention should be fixed by the claims presented, rather than by the examples given.

What is claimed is:

1. An optical deflector comprising:
a mirror part that has a flat reflection surface and a grooved reflection surface, each of the flat reflection surface and the grooved reflection surface reflecting an incident light; and
a first actuator that reciprocally turns the mirror part about a first rotation axis,
wherein:
the grooved reflection surface has a plurality of longitudinal grooves that extend parallel to the first rotation axis,
each longitudinal groove has a facing inclination surface that is parallel to the first rotation axis and that has at least an opening-side portion of a facing inclination surface of a V-groove, and
both facing inclination surfaces of the V-groove have inclination angles that are equal to each other with respect to a reference bottom plane, the reference bottom plane passing through a trough line of the V-groove and being parallel to the flat reflection surface.

2. The optical deflector according to claim 1, wherein the facing inclination surfaces of the longitudinal groove form a shape in which a bottom portion of the V-groove is cut off.

3. The optical deflector according to claim 2, wherein:
a cut plane that passes through the V-groove parallel to the flat reflection surface at an intermediate position in a depth direction of the V-groove is defined,
the facing inclination surface of the V-groove is divided along the cut plane into an opening-side portion and a closing-side portion, the opening-side portion being a portion on an opening side of the V-groove, and the closing-side portion being a portion on a closing side of the V-groove,
lengths of the opening-side portion and the closing-side portion on a transverse section of the V-groove are Da and Db respectively,
the inclination angle of the V-groove with respect to the reference bottom plane is $\beta$,
the cut plane satisfies a condition of Da:Db=$|\tan(2\cdot\beta)|$:$|\tan(\beta)|$, and
the facing inclination surface of the longitudinal groove has a shape in which the closing-side portion is cut off.

4. The optical deflector according to claim 3, wherein:
the mirror part has the flat reflection surface and the grooved reflection surface on a surface of a common substrate layer formed of a crystal layer of silicon, and
Miller indices of a principal surface of the crystal layer and the facing inclination surface of the longitudinal groove are one and the other of (100) and (111) respectively.

5. The optical deflector according to claim 2, wherein the sum of the inclination angles of both facing inclination surfaces of the V-groove with respect to the reference bottom plane is in a range of 80° to 120°.

6. The optical deflector according to claim 1, wherein the inclination angle of each facing inclination surface with respect to the reference bottom plane is 54.7°.

7. The optical deflector according to claim 1, wherein the grooved reflection surface is provided on the first rotation axis.

8. The optical deflector according to claim 7, wherein the grooved reflection surface is provided at a central portion of the mirror part.

9. An optical scanning apparatus comprising:
an optical deflector comprising:
a mirror part that has a flat reflection surface and a grooved reflection surface, each of the flat reflection surface and the grooved reflection surface reflecting an incident light, and
a first actuator that reciprocally turns the mirror part about a first rotation axis:
an optical source that generates the incident light, the incident light entering the mirror part; and
an optical sensor that receives a two-time reflected light, the two-time reflected light being emitted after the incident light is reflected in the longitudinal groove of the grooved reflection surface of the mirror part two times,
wherein:
the grooved reflection surface has a plurality of longitudinal grooves that extend parallel to the first rotation axis, and
each longitudinal groove has a facing inclination surface that is parallel to the first rotation axis and that has at least an opening-side portion of a facing inclination surface of a V-groove.

10. The optical scanning apparatus according to claim 9, wherein the optical sensor is provided on both sides of a perpendicular reference plane that passes through a center of the mirror part perpendicularly to the flat reflection surface when the mirror part has a central deflection angle in a deflection width about the first rotation axis.

11. The optical scanning apparatus according to claim 10, wherein:
the optical deflector comprises a second actuator that reciprocally turns the mirror part about a second rotation axis orthogonal to the first rotation axis, and
the optical sensor extends along a scanning trajectory of scanning of the two-time reflected light from the mirror part when the mirror part is reciprocally turned about the second rotation axis.

12. The optical deflector according to claim 9, wherein the facing inclination surfaces of the longitudinal groove form a shape in which a bottom portion of the V-groove is cut off.

13. The optical deflector according to claim 9, wherein:
a cut plane that passes through the V-groove parallel to the flat reflection surface at an intermediate position in a depth direction of the V-groove is defined,
the facing inclination surface of the V-groove is divided along the cut plane into an opening-side portion and a closing-side portion, the opening-side portion being a portion on an opening side of the V-groove, and the closing-side portion being a portion on a closing side of the V-groove,
lengths of the opening-side portion and the closing-side portion on a transverse section of the V-groove are Da and Db respectively,
the inclination angle of the V-groove with respect to the reference bottom plane is $\beta$,
the cut plane satisfies a condition of Da:Db=$|\tan(2\cdot\beta)|$:$|\tan(\beta)|$, and
the facing inclination surface of the longitudinal groove has a shape in which the closing-side portion is cut off.

14. The optical deflector according to claim 9, wherein the sum of the inclination angles of both facing inclination surfaces of the V-groove with respect to the reference bottom plane is in a range of 80° to 120°.

15. The optical deflector according to claim 9, wherein:
the mirror part has the flat reflection surface and the grooved reflection surface on a surface of a common substrate layer formed of a crystal layer of silicon, and Miller indices of a principal surface of the crystal layer and the facing inclination surface of the longitudinal groove are one and the other of (100) and (111) respectively.

16. An optical deflector comprising:
a mirror part that has a flat reflection surface and a grooved reflection surface, each of the flat reflection surface and the grooved reflection surface reflecting an incident light;
a first actuator that reciprocally turns the mirror part about a first rotation axis; and
a second actuator that reciprocally turns the mirror part about a second rotation axis orthogonal to the first rotation axis,
wherein:
the grooved reflection surface has a plurality of longitudinal grooves that extend parallel to the second rotation axis, and
each longitudinal groove has a facing inclination surface that is parallel to the second rotation axis and that has at least an opening-side portion of a facing inclination surface of a V-groove.

17. The optical deflector according to claim 16, wherein:
both facing inclination surfaces of the V-groove have inclination angles that are equal to each other with respect to a reference bottom plane, the reference bottom plane passing through a trough line of the V-groove and being parallel to the flat reflection surface,
the facing inclination surface of the longitudinal groove has a shape in which a bottom portion of the V-groove is cut off,
a cut plane that passes through the V-groove parallel to the flat reflection surface at an intermediate position in a depth direction of the V-groove is defined,
the facing inclination surface of the V-groove is divided along the cut plane into an opening-side portion and a closing-side portion, the opening-side portion being a portion on an opening side of the V-groove, and the closing-side portion being a portion on a closing side of the V-groove,
lengths of the opening-side portion and the closing-side portion on a transverse section of the V-groove are Da and Db respectively,
the inclination angle of the V-groove with respect to the reference bottom plane is $\beta$,
the cut plane satisfies a condition of Da:Db=|tan(2·$\beta$)|:|tan($\beta$)|, and
the facing inclination surface of the longitudinal groove has a shape in which the closing-side portion is cut off from the V-groove, as the shape in which the bottom portion of the V-groove is cut off.

18. An optical scanning apparatus comprising:
the optical deflector according to claim 16;
an optical source that generates the incident light, the incident light entering the mirror part; and
an optical sensor that receives a two-time reflected light, the two-time reflected light being emitted after the incident light is reflected in the longitudinal groove of the grooved reflection surface of the mirror part two times, the optical sensor extending along a scanning trajectory of scanning of the two-time reflected light when the mirror part is reciprocally turned about the first rotation axis.

19. The optical scanning apparatus according to claim 18, wherein the optical sensor is provided on both sides of the optical deflector in a direction of the second rotation axis.

* * * * *